United States Patent [19]

Corrothers

[11] Patent Number: 4,812,722
[45] Date of Patent: Mar. 14, 1989

[54] MULTI-MODE FORCE CONTROL CIRCUIT
[75] Inventor: Robert S. Corrothers, Orange County, Calif.
[73] Assignee: Cams, Inc., Buena Park, Calif.
[21] Appl. No.: 112,540
[22] Filed: Oct. 26, 1987
[51] Int. Cl.$^4$ ............... B23K 20/00; G05B 19/00
[52] U.S. Cl. ............................. 318/561; 318/567; 228/102
[58] Field of Search ............... 318/567, 561, 434; 364/476, 474; 228/101, 102, 106, 115, 8, 9, 12, 10

[56] References Cited

U.S. PATENT DOCUMENTS

| | | | |
|---|---|---|---|
| 3,727,822 | 4/1973 | Umbaugh | 228/9 X |
| 4,340,166 | 7/1982 | Bilane et al. | 228/4.5 X |
| 4,473,215 | 9/1984 | Rathfon et al. | 364/476 X |
| 4,496,095 | 1/1985 | Renshaw | 228/102 |
| 4,511,976 | 4/1985 | Graf | 364/476 X |
| 4,603,802 | 8/1986 | Kurtz et al. | 228/102 |
| 4,606,489 | 8/1986 | Steinhart | 228/102 |
| 4,619,396 | 10/1986 | Yamamoto | 228/102 |

Primary Examiner—Bentsu Ro
Attorney, Agent, or Firm—James F. Kirk

[57] ABSTRACT

A multi-mode force control apparatus and circuit for applying a predetermined time dependent force to a workpiece having a variable compliance. The workpiece is supported by an anvil and an actuator is used for applying force to the workpiece. The multi-mode force control apparatus has a position mode sequence that provides a composite position command signal characterizing the predetermined time dependent position of the hammer. A position servo amplifier provides an input control signal to move the hammer from a retracted position to a predetermined first position close to the workpiece. The hammer is then moved slowly into contact with the workpiece. A force reference command signal representing the predetermined time dependent force is increased to a predetermined value. A force signal from a force transducer then rises to a value of voltage representing an ultimate actual force value. A force hold mode timing sequence provides a force hold mode time interval. During a force rise mode sequence and the force hold mode time interval, the actual applied force is regulated in response to variations in the workpiece compliance detected from variations in the force transducer force signal to substantially prevent the force actual applied to the workpiece from exceeding the predetermined time dependent force. A retract mode sequence returns the hammer to the retracted position.

15 Claims, 22 Drawing Sheets

MULTI-MODE FORCE CONTROL CIRCUIT

FIELD OF THE INVENTION

This invention relates to the field of control systems and more particularly to the field of servo controlled systems for positioning a tool and applying a force to the workpiece via the tool.

PRIOR ART

Control systems used in the part for compression welding have typically operated as open loop sequential machines for first positioning a hammer or die in relation to the workpiece to be welded followed by a second separate sequence in which the hammer is moved and accelerated to a predetermined velocity and allowed to strike the workpiece to achieve the weld.

Prior art systems of this type were typically unsuited for work with semiconductor dies where tolerances of both force and impact must be tightly controlled to avoid damage to the die. Changes in temperature, humidity, wear and variation in machine friction coefficients contribute to a continuing maintenance cost associated with such earlier machine designs. Such open loop machines require frequent re-calibration and service and these requirements limit the number of cycles a mchine can perform before interrupting production for maintenance or service.

SUMMARY OF THE INVENTION

It is a first object of this invention to provide a multi-mode force control circuit for controlling a servo system to move a hammer from a restored position to a position in contact with a workpiece and apply a predetermined force without overshoot.

It is a second object of this invention to advance from a first mode of operation in which the hammer is positioned at high speed to a location relatively close to the workpiece, to a second mode in which the system moves the hammer at very low velocity into contact with the workpiece and gradually increases force applied to the workpiece in accordance with a predetermined rate of increase until a predetermined threshold is exceeded.

The system then transitions to a third mode in which the force applied to the workpiece follows a predetermined force versus time profile until the applied force exceeds a predetermined threshold referred to as the ultimate force. As the applied force exceeds the predetermined threshold, the system transitions to a fourth mode in which a constant level of force is applied to the workpiece for a predetermined interval after which the system advances to a fifth mode in which the hammer is retracted from its position against the workpiece to a reset or home position.

Each change in mode is substantially free of any oscillation or overshoot. As the system transitions from a position to a force mode or from a force to a position mode, the movement of the hammer and the force applied to the workpiece is precisely controlled as in a typical system, with a resolution of less than ten (10) grams over a range of two-hundred and twenty five (225) grams to twenty-seven thousand two-hundred and sixteen (27,216) grams.

BRIEF DESCRIPTION OF THE DRAWINGS

FIG. 4a is an insert graph into FIG. 4 that schematically depicts the relationship between the D(LMT) logic signal and a delayed signal into inverter 442.

PREFERRED EMBODIMENT

Figure 1:
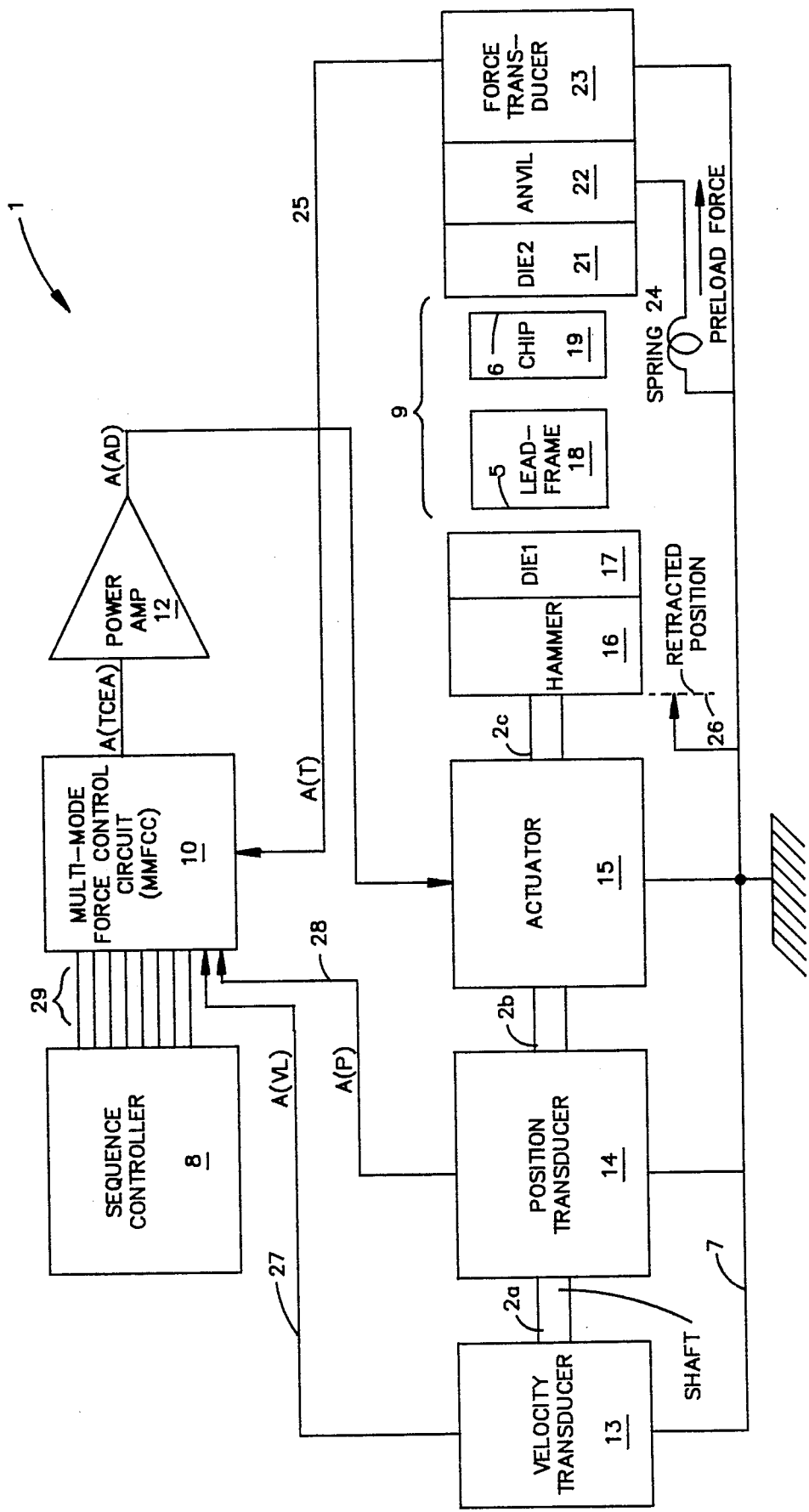
FIG. 1 is a block diagram depicting the invention multi-mode force control circuit within a TAB (tape automated bonding) system.

FIG. 1 is a block diagram of the invention multi-mode force control apparatus 1 as used in a machine designed for inner lead bonding. Elements of the machine are positioned with reference to each other by frame 7. Frame 7 is shown schematically at the base of the drawing. The invention apparatus 1 performs a bonding operation on a workpiece such as that represented by the group of parts bracketed by reference numeral 9 and having a first and second surface 5, respectively. Other typical applications for which the invention apparatus 1 is equally suited include, applications for applying a predetermined transient free time dependent force to a workpiece such as a automatic torquing apparatus or a hardness tester.

VARIABLE COMPLIANCE

The workpiece can have a variable compliance. the term variable compliance is meant to characterize a property of the workpiece such as a non-linear crumpling or crushing property such that as a force is applied to the workpiece by the invention apparatus 1, and as the yield point of the workpiece material is exceeded, the material ceases to obey Hooke's law. The word crumple is explained in the Webster's Collegiate Dictionary, 1983 to mean "to press, bend, or crush out of shape . . . to cause to collapse". Lead frame material is typically soft malleable material such as gold alloys that undergo substantial deformation in inner lead bonding.

The yield point of the material is that point at which there occurs a marked increase in strain without a corresponding increase in stress. In operation, as the invention apparatus 1 begins to apply force to the workpiece, the workpiece finds support on contacts, such as gold or other soft metal which compresses and crumples to form compression bonds with the lead frame in response to the compressive loads. Crumpling results in an indeterminate loss of opposing force provided by the workpiece to the dies as a compressive load is applied.

The term crumpling is meant to characterize the yield strength of the workpiece material, i.e. the stress at which the material exhibits a specified limiting permanent set. This set is usually determined by the approximate method of calculating the percentage of deviation from Hooke's law at any given stress as equal to the percentage of permanent set, after removal of the stress.

Referring again to FIG. 1, the invention apparatus 1 is shown having a power amplifier 12 responsive to an input control signal A(TCEA) for providing a actuator drive signal A(AD) to the input of actuator 15. The "A" leading the term A(AD) stands for "ANALOG" as distinguished from "D" for "DIGITAL". The "AD" term stands for "ACTUATOR DRIVE".

As shown in FIG. 1, the multi-mode force control circuit (MMFCC) 10 is characterized to receive a position transducer position signal A(P) via signal line 28. The invention multi-mode force control circuit 10 receives the digital autozero strobe signal D(ST), followed by, the discrete start/return signal D(SR) from the sequence controller 8, each via a discrete line in signal buss 29, and the force transducer force signal A(T) via signal line 25 from the transducer 23.

Actuator 15 is responsive to, i.e. is coupled to receive the actuator drive signal A(AD). Actuator 15 is mechanically referenced to the frame 7 for moving hammer 16 from a retracted position 26 such as shown in FIG. 1 to contact the workpiece 9 interposed between the die 1, 17 and die 2, 21.

The die 2, 21 receives and supports the second surface 6 of the workpiece 9 with reference to the frame 7. Die 2 is backed and supported by anvil 22. The actuator depicted in FIG. 1 has an integral shaft 2a, 2b, 2c that translates laterally from the position shown to the right. The actuator 15 is therefore depicted as a linear actuator; however, this depiction is not intended to be limitative since rotational actuators are contemplated for alternative applications of the invention apparatus 1 as well.

Force transducer 23 is interposed between the anvil 22 and the frame 7 for providing a force signal A(T) via signal line 25 to multi-mode force control circuit (MMFCC). The signal A(T) is scaled to correspond to the force applied to the workpiece by the actuator 15 via the shaft 2c to the hammer 16 and then via the anvil 22.

Spring 24 represents a preload means for applying a predetermined preload force to hold the anvil against the force transducer to eliminate the possibility of any lash or uncontrolled mechanical freedom of motion.

Position transducer 14 provides a position signal that represents the position of the hammer with respect to the workpiece. The position signal corresponds to the hammer location via shaft 2b and 2c. The position signal A(P) is a linear signal scaled to have a magnitude corresponding to the distance of the hammer 16 from the retracted or home position shown in FIG. 1 schematically by reference line 26.

Velocity transducer 13 provides a damping signal A(VL) via signal line 27 to the multi-mode force control circuit (MMFC) 10. The A(VL) signal is scaled to correspond to the velocity of the hammer 16 with respect to the frame 7.

The sequential operation of the invention MMFCC is under the control of a controller such as a dedicated sequential controller 8. The invention MMFCC is designed to operate in response to signals from the sequential controller to provide multiple modes of operation in a predetermined repeating series. Sequence controller 8 provides a series of discrete logic signals via a sixteen signal line buss 29 in FIG. 1. The signals provided have a first and second logic state such as a true or high state and a false or low state to start, to control and to stop each machine cycle. A general purpose computer such as an IBM P/C can be adapted to serve as a sequential controller to provide the sequential series of signals required.

The preferred embodiment was reduced to practice using a 7252 Industrial Controller with a 24 input board and 24 output board options. The 7252 Industrial Controller uses an 8-bit INTEL 8052 microprocessor with an interpeted Basic ROM and 8K of memory. The 7252 Industrial Controller is supplied by the Encoder Products Co., P.O. Box 1548, 1601-B Dover Rd., Sandpoint, Ind., 83864, phone number (208) 263-8541. A copy of the source program written in BASIC and having a copyright notice affixed is appended to this application as an appendix.

TIMING DIAGRAM

Figure 5:
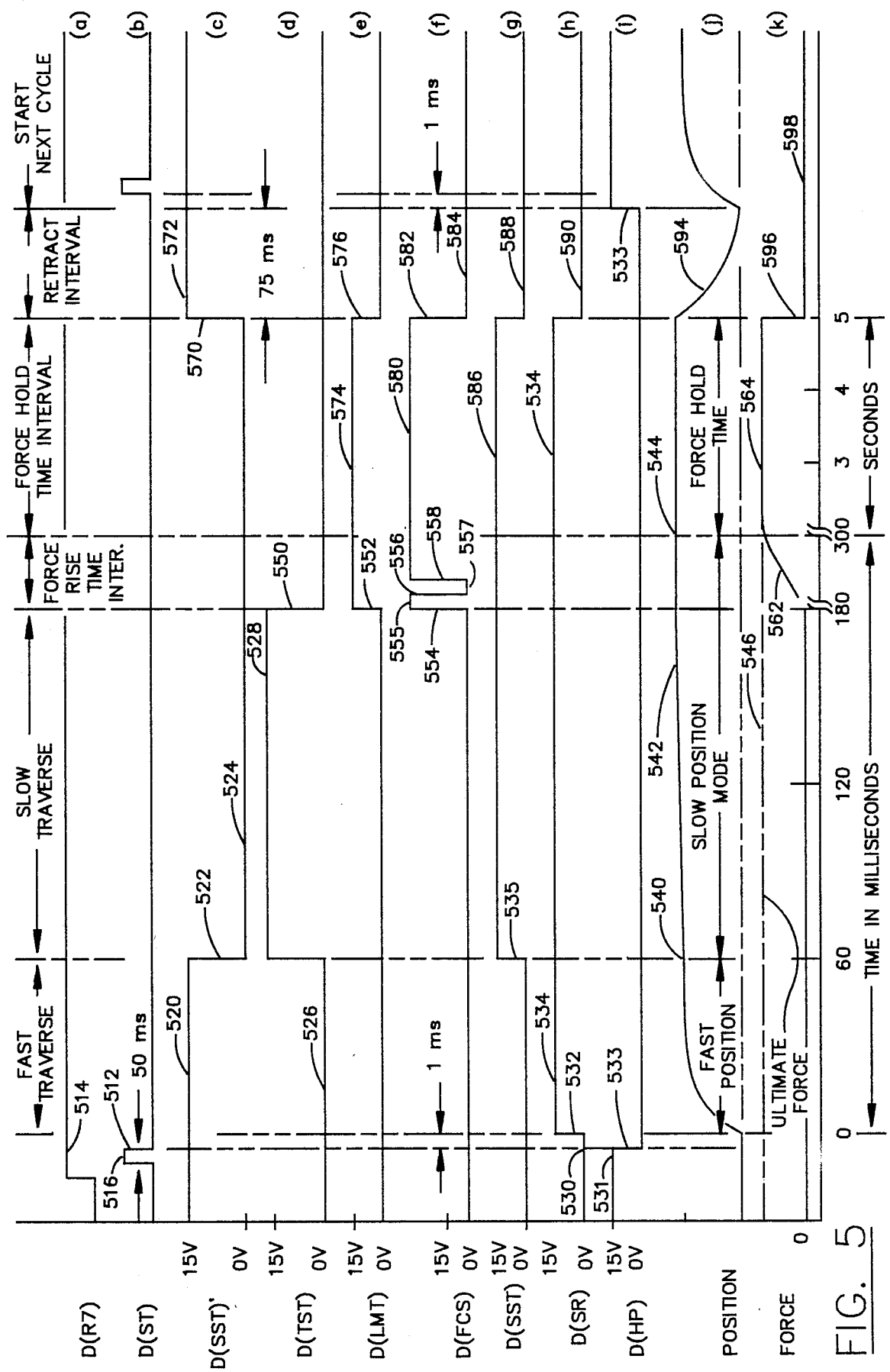
FIG. 5 is a timing diagram showing particular intervals of the multi-mode force control circuit and system in relationship to the digital control signals, position of the hammer with respect to time and force with respect to time.
Figure 14:
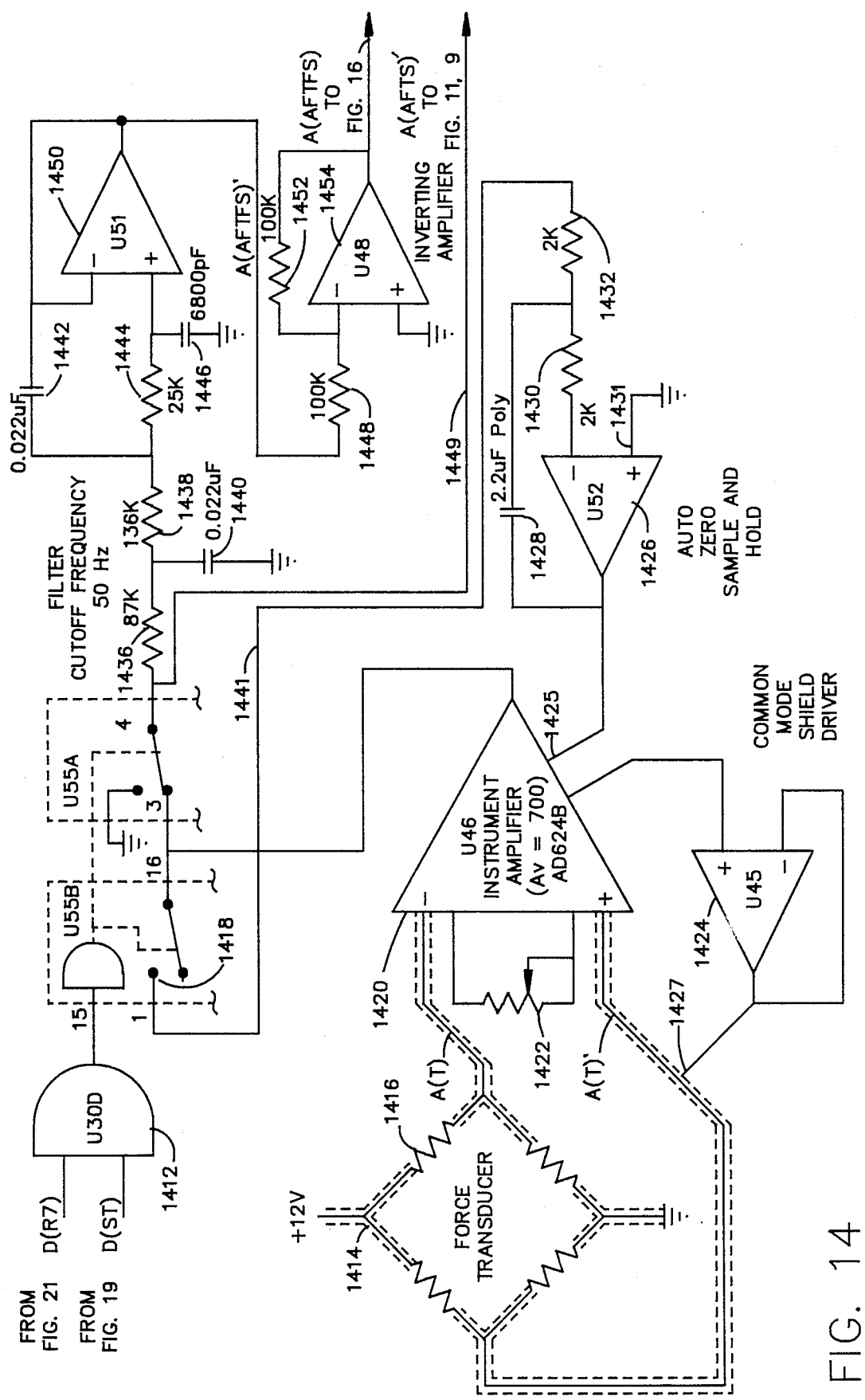
FIG. 14 is a schematic diagram showing the force transducer signal conditioning circuit with an autozero function.

FIG. 5 is a timing diagram showing the time relationships between waveforms (a)-(k). The interval to the left of T=0 is an initialization interval during which the calibration of the force transducer is completed during the strobe interval of 50 ms shown as D(ST) 516 waveform (b). Referring to FIG. 14, the strobe interval is enabled by D(R7), waveform (a) as both D(ST) and D(R7) are anded by "AND" gate U30D 1412. The output of U30D transfers analog switches U55B and U55A during the D(ST) interval.

The machine cycle is typically started after the rise of D(R7) 512 by the sequence controller providing logic signal such as auto-zero strobe signal D(ST) shown in FIG. 5 as waveform (b) 516, of predetermined duration, followed by a discrete start signal D(SR), waveform (h) rising from a low lever 530 via transition 532 to a high level 534.

A fast position sequence is initiated concurrent with transition 532 for each machine cycle by sequence controller 8. The sequence controller 8 has a memory means (not shown) such as an eprom or ram for storing a digital ultimate force signal or value characterized in FIG. 5 by phantom line 546 on waveform (k), to be applied to the workpiece.

Figure 12:
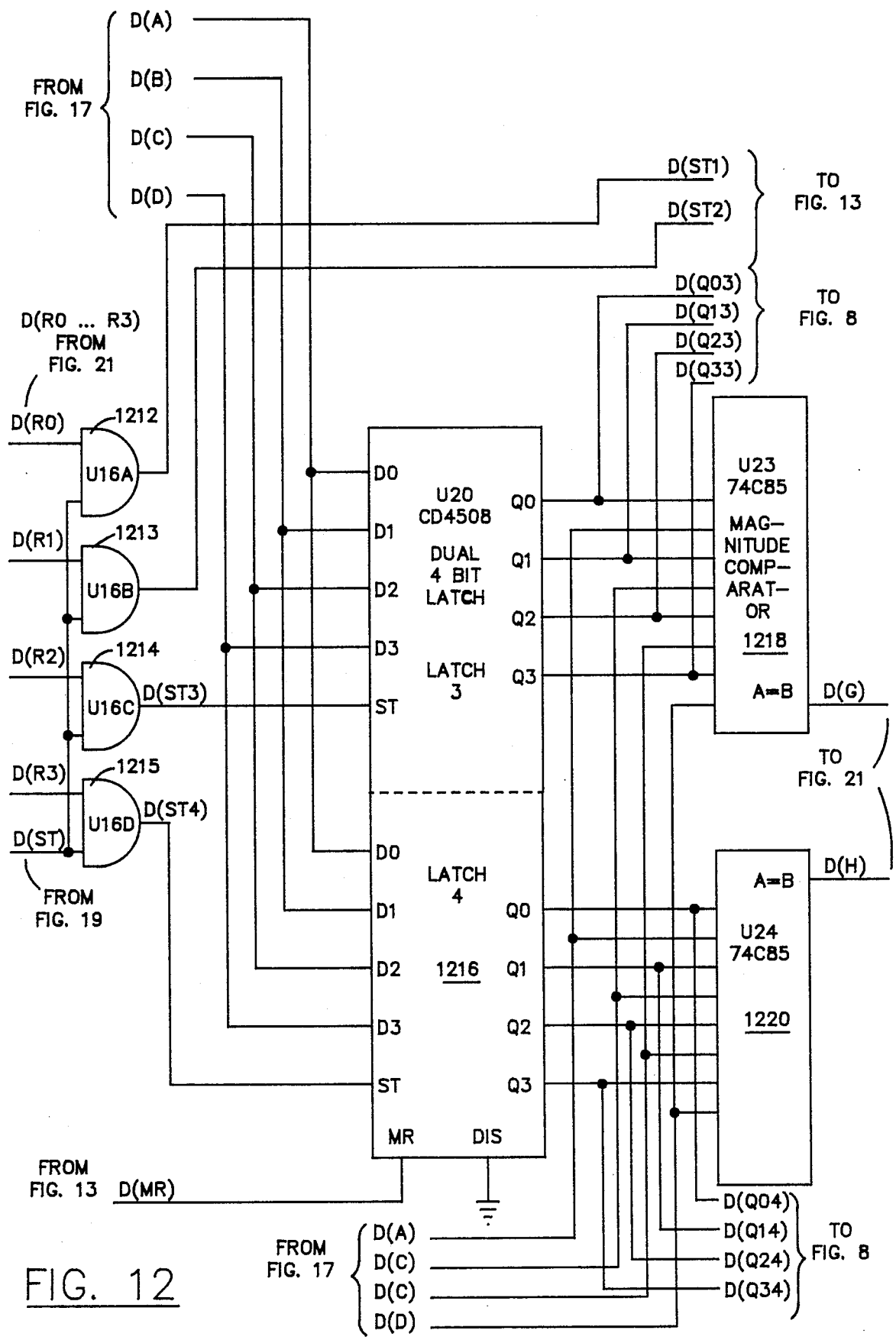
FIG. 12 is a schematic diagram showing latches for retaining data sent by the sequent controller.
Figure 17:
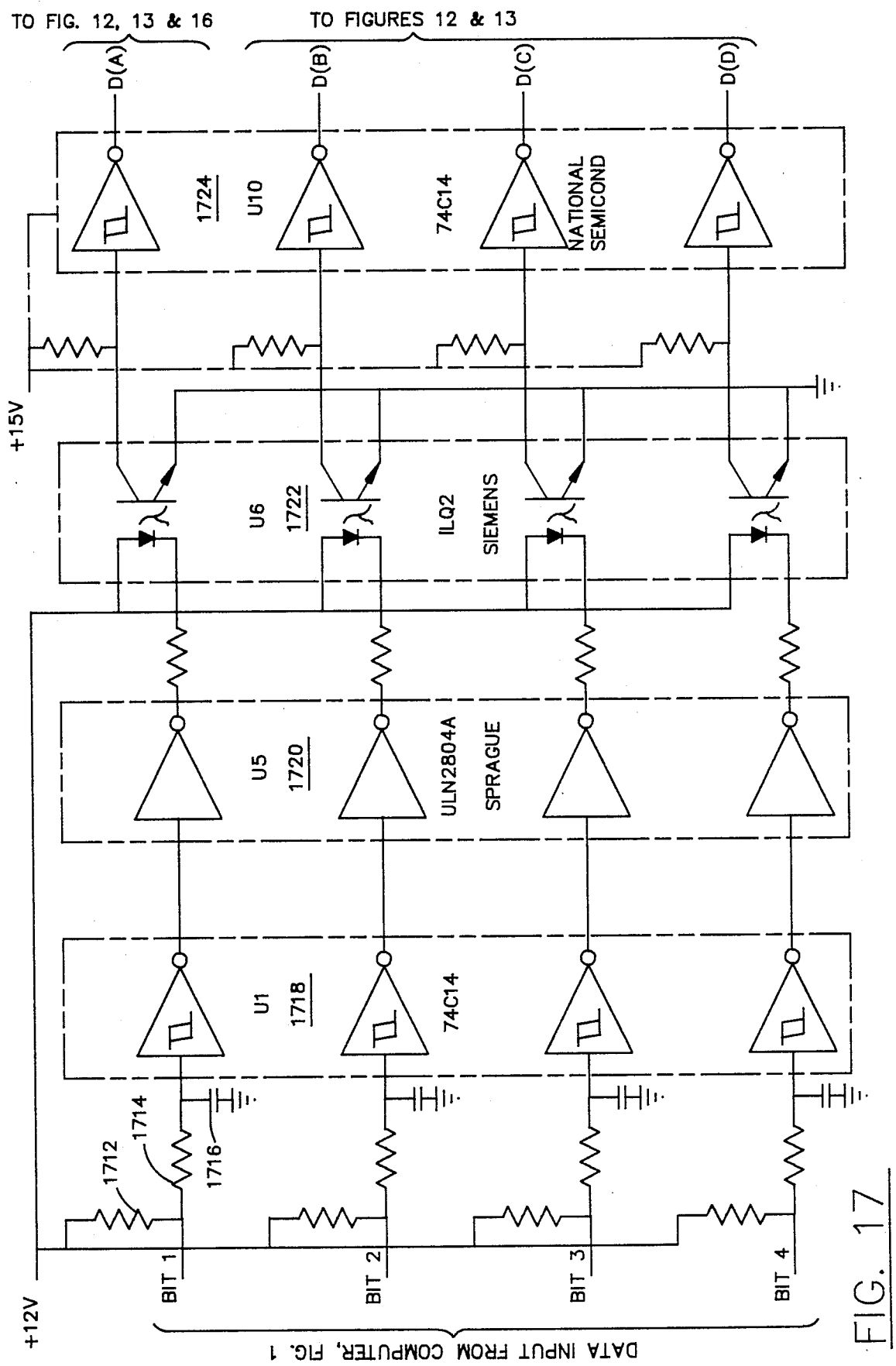
FIG. 17 is a schematic diagram showing a four bit input data buss interference received from the sequence controller and optically coupled to the multi-mode force control circuit.

The sequence controller memory means also stores and provides a digital slow velocity signal to characterize the closing velocity of the hammer 16 with the workpiece 9 shown on FIG. 1. The sequence controller transmits the digital ultimate force signal and the digital slow velocity signal to the multi-mode force control circuit (MMFCC) 10 via a digital buss such as the INPUT DATA BUSS on FIG. 17, BITs 1-4 and then to the latches on FIGS. 12 and 13. Each digital signal is then bussed to a DAC, for conversion of the ultimate force signal and a one of eight mux, for conversion of the slow velocity signal.

As an alternative embodiment, the required data buss signals can also be provided by preselecting an array of dedicated panel switches wired to connect a voltage level equivalent to the logic level for a true logic level to the respective data buss signal lines or analog signals can be provided directly from precision adjustable sources.

Figure 18:
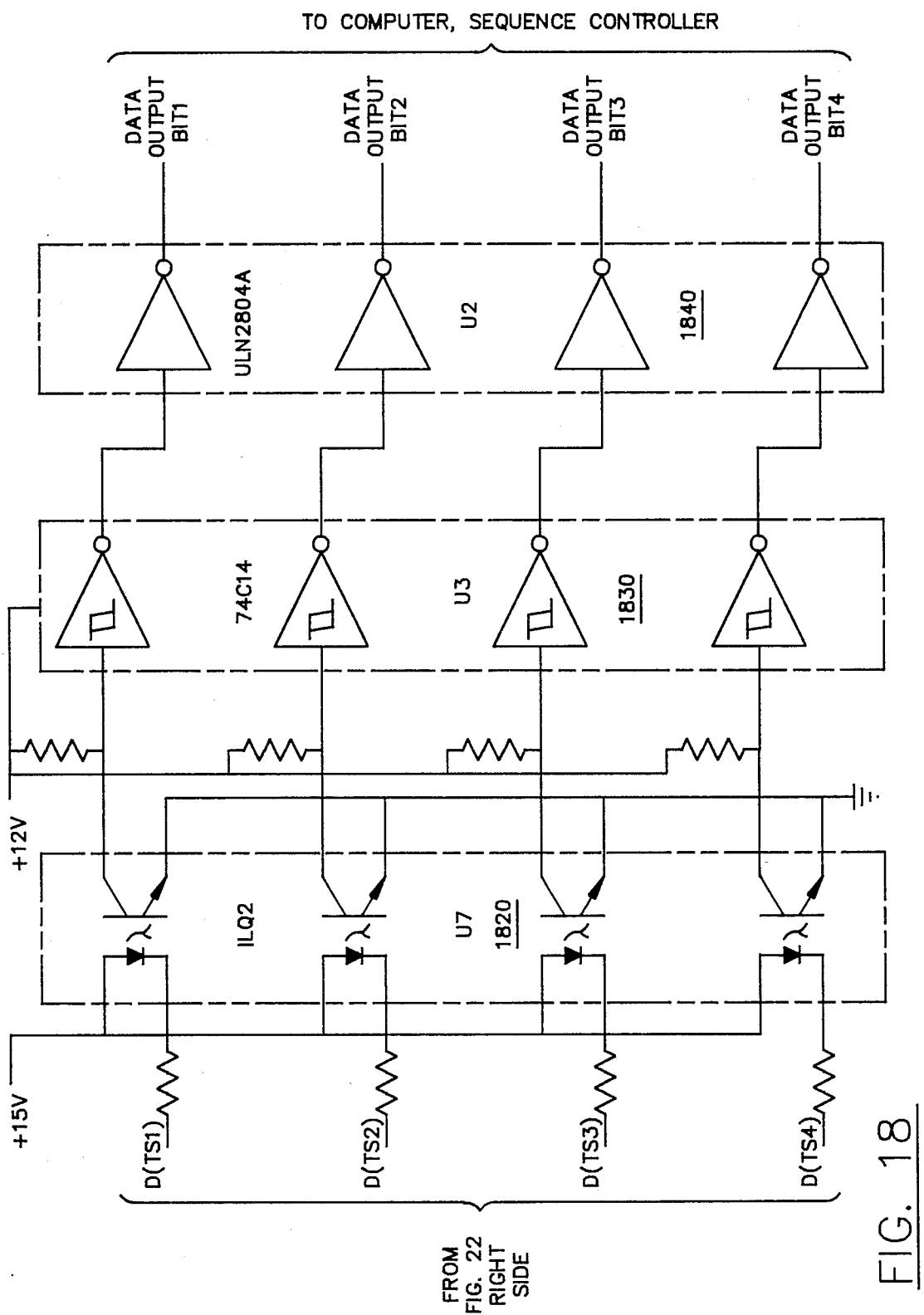
FIG. 18 is a schematic diagram showing a four bit output data buss interface transmitted from the multi-mode force control circuit and optically coupled to the sequence controller.
Figure 19:
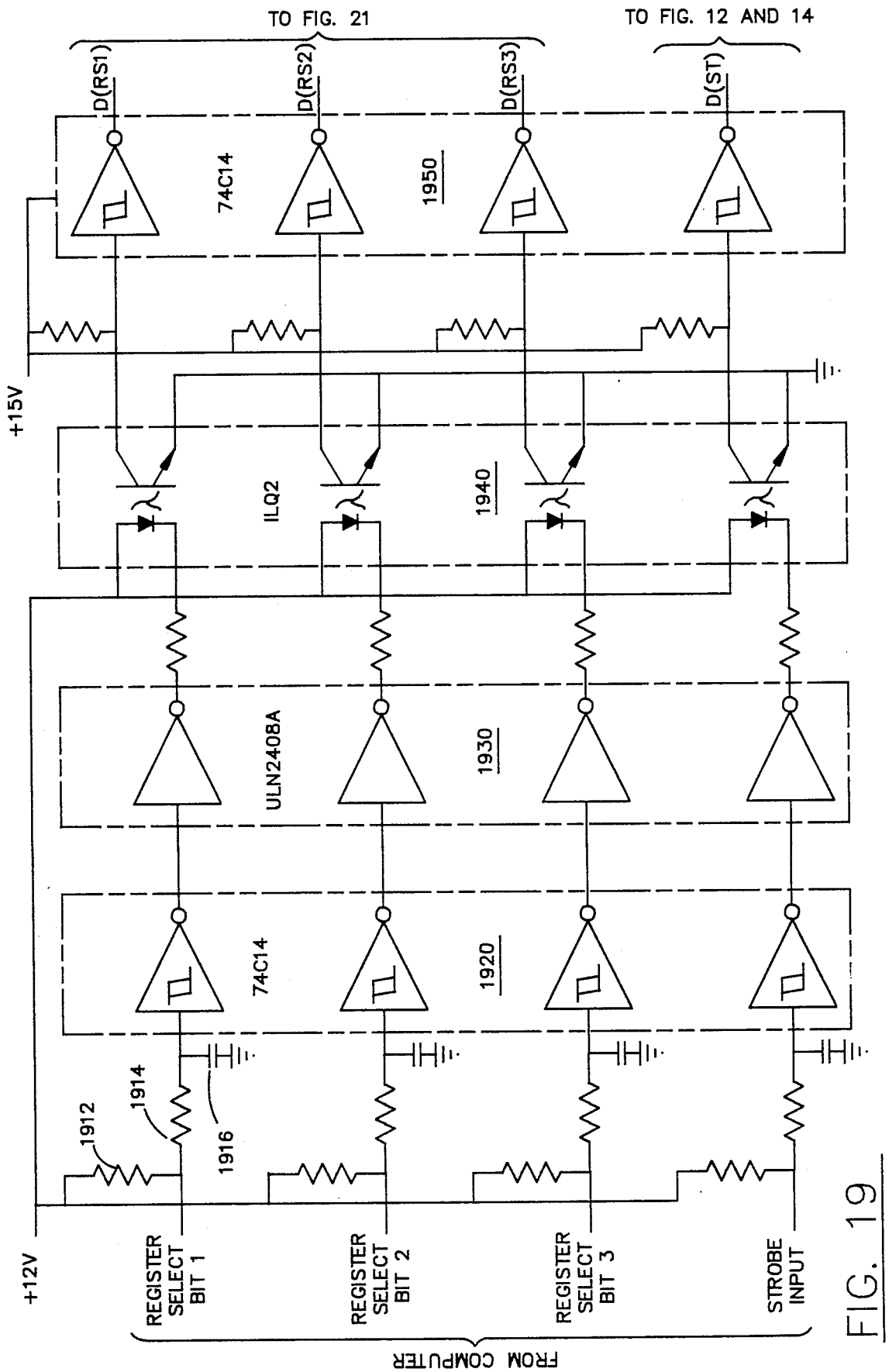
FIG. 19 is a schematic diagram showing a three bit register or data select interface buss, and a discrete strobe signal received from the sequence controller and optically coupled to the multi-mode fore control circuit.
Figure 20:
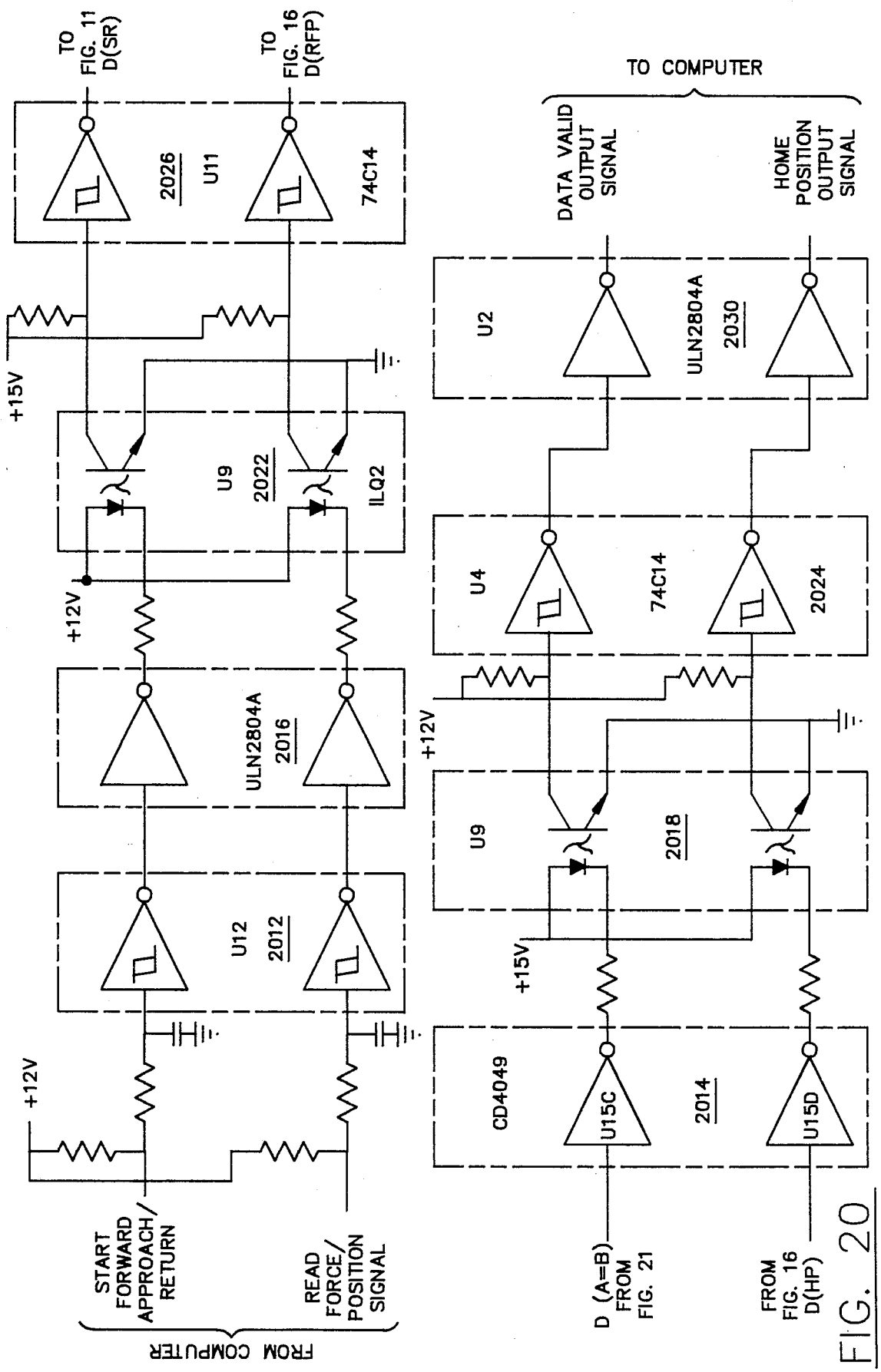
FIG. 20 is a schematic diagram showing typical isolated circuitry for receiving a discrete START FORWARD APPROACH/RETURN signal, D(SR) and a second discrete signal for READ FORCE/POSITION SIGNAL, for coupling these signals to the invention apparatus 1. This figure also shows circuitry for coupling two discrete signals, D(HP) and D(A=B) from the invention apparatus to the sequence controller.
Figure 21:
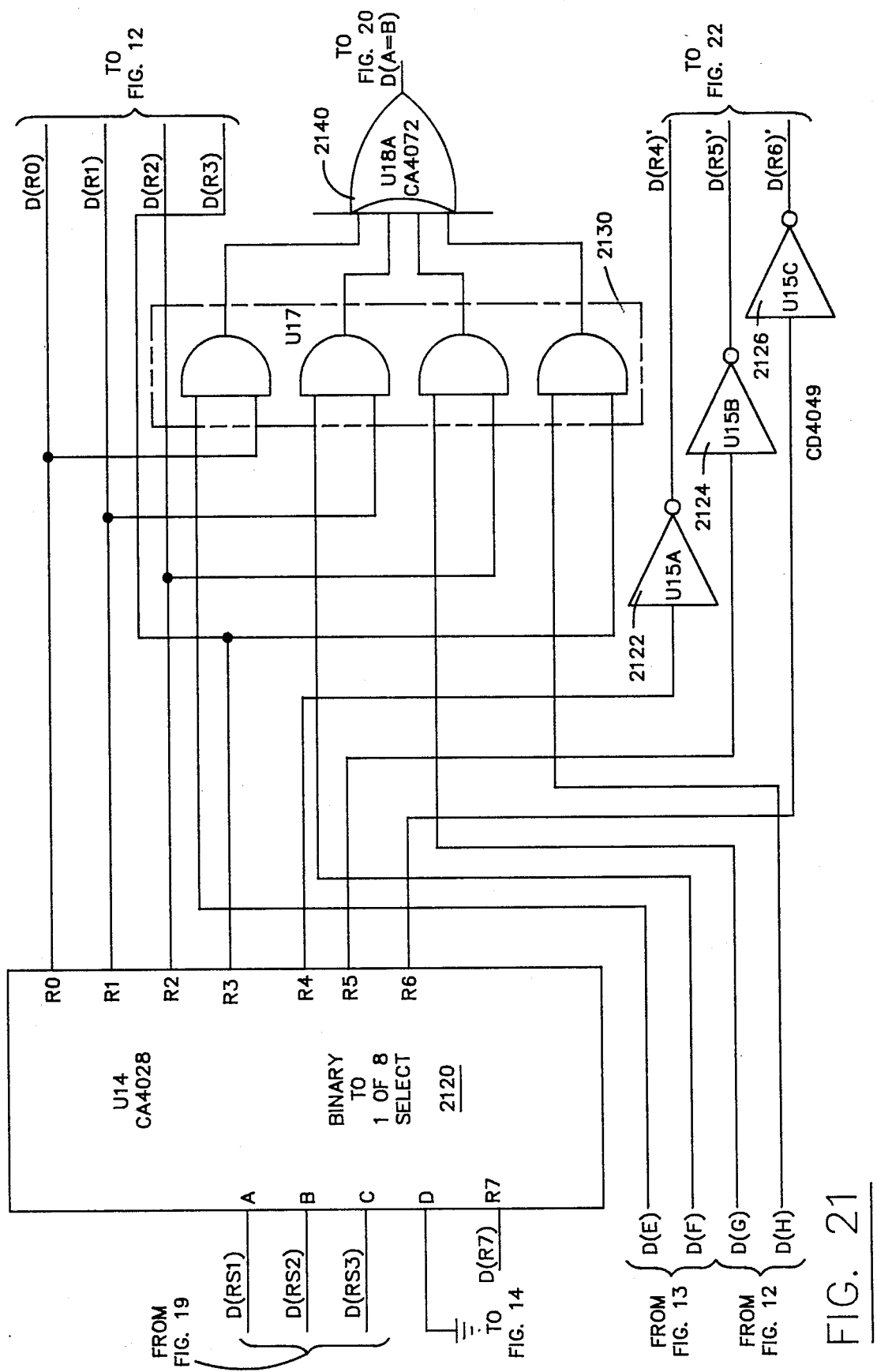
FIG. 21 is a schematic diagram showing a three line to eight line demultiplexer for selecting one of the eight registers in the multi-mode force control circuit. This figure also shows the origin of D(A=B).

The sequence controller 8 also provides a means for monitoring a digital force transducer signal sent by the MMFCC 10 to the sequence controller 8 via an output data bus as shown on FIG. 18. Such a means might typically comprise a provision for periodically sampling and storing a digital value of the force applied to the transducer by the actuator 15 via shaft 2c and hammer 16.

The sequence controller 8 typically has a digital comparator means, (not shown) but easily implemented by a sequential program for comparing the digital force transducer signal value with the value of the digital ultimate force signal, for providing a force hold time interval start signal at the end of the force rise time as the digital force transducer signal equals or exceeds the digital ultimate force signal. The force hold time interval start signal is only used within the sequence controller 8 to start the force hold timer.

In addition to the digital comparator means, the sequence controller 8 typically has a timing means for starting a predetermined force hold time interval as shown in FIG. 5 following the force rise time interval. The force rise time interval starts with the occurrence of the D(LMT) signal representing the latched force mode transfer signal. It is understood that the timing means can be either digital, i.e. based on a clock signal driving a conventional program counter (not shown) or a time base established by a timer such as an NE555 or equivalent circuit.

The timing means is further characterized to reset the start signal D(SR), waveform (h) of FIG. 5 as shown at the transition from 534 to 590. The force hold time interval starts at 544 on waveform (j) and extends to the start of the fast traverse retract interval waveform (c) 570.

INITIALIZING THE MMFCC

Figure 13:
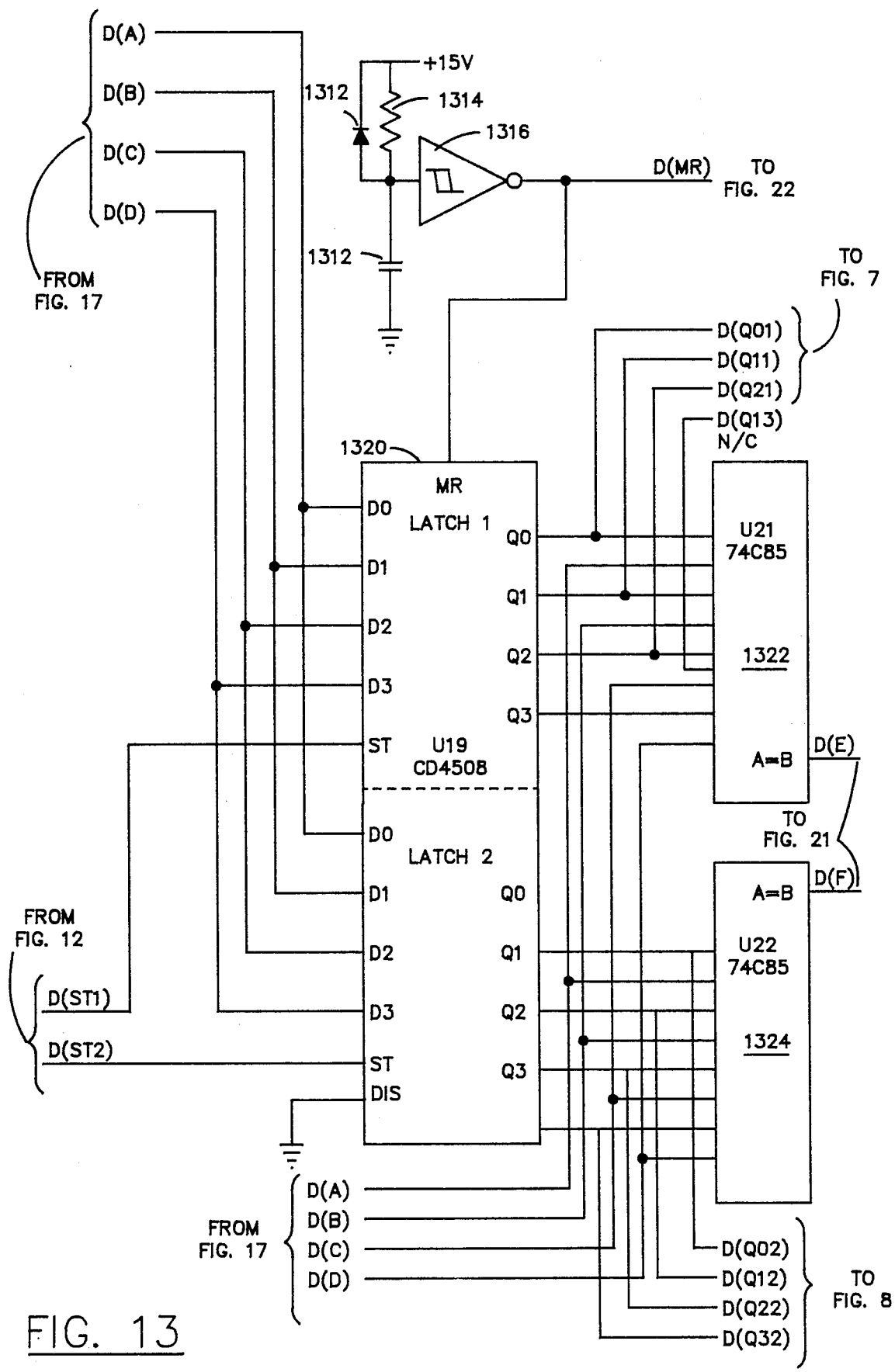
FIG. 13 is a schematic diagram showing latches for retaining data sent by the sequence controller and the origin of D(MR).

Referring to FIG. 13, as power is applied to the MMFCC, capacitor 1312 begins charging via resistor 1314 from the positive 15 volt source. The input of schmitt inverter 1316 is connected to the RC node, which is rising in an exponential function with respect to ground. The output of inverter 1316 is still in a high state providing the D(MR) signal a MASTER RESET SIGNAL to latches 1320 and 1216 of FIGS. 13 and 12 respectively. As the voltage increases on the RC node a threshold voltage of inverter 1316 will be reached and its output changing to a low state no longer providing the D(MR) signal after a period of one second. This action sets all of the outputs on latches 1320 and 1216 to a known default state of zero.

Figure 7:
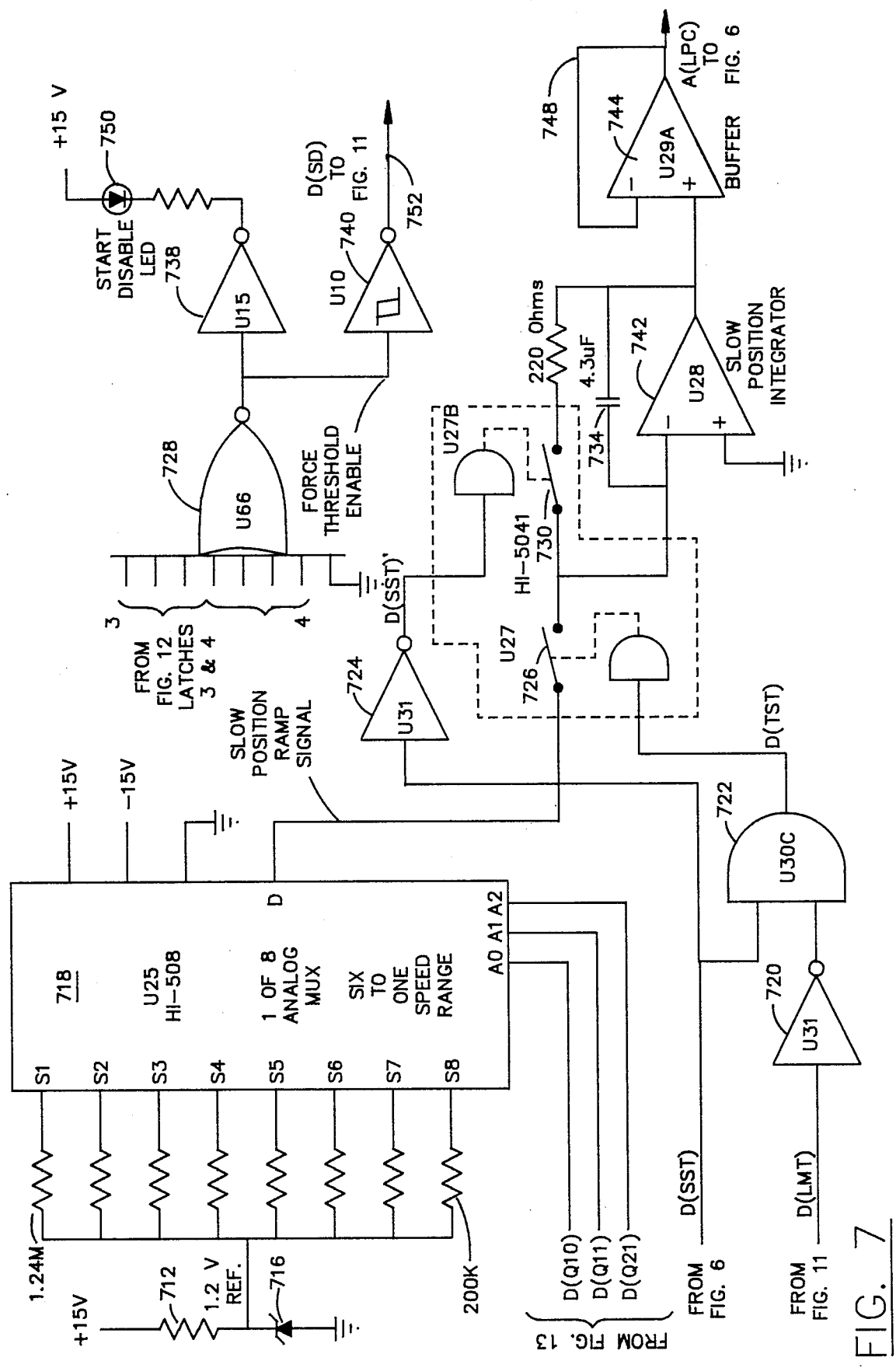
FIG. 7 is a schematic diagram showing the origin of the slow position command signal and the origin of the force threshold enable signal.

Referring to FIG. 7, the D(SD) signal originates at the output of inverter U10, 740. The D(SD) signal is a START DISABLE SIGNAL which signifies that the sequence controller has not initialized the MMFCC by transmitting the required minimum ultimate force value via the data input buss shown on FIG. 17, to latch 2 shown on FIG. 13, and to latches 3 and 4 shown on FIG. 12. Latches 3 and 4 send a seven bit word containing the seven most significant bits of a 12 bit ultimate force value word. The bits range from the most significant DQ34 bit to the sixth DQ13 bit.

The NOR GATE U66 on FIG. 7 receives these bits. If any one of these bits are high, the output of NOR GATE U66 will be low forcing the output of schmitt inverter U10, 752 to be high. The D(SD) output of U10 will be low only if all seven bit lines into U66 are low signalling that the required minimum ultimate force value has not been sent by the sequence controller approximately 225 grams =32*27216/4095. 32 stands for the numerical weight of the sixth bit of the digital ultimate force value, 27216 is a number representing the maximum number of grams for the machine, and 4095 is the resolution of the desired value of the digital ultimate force set point. If the D(SD) signal is false, the start operation signaled by D(SR) is inhibited.

Referring to FIG. 14, the D(R7) signal goes true by operation of the sequencer controller and the D(ST) signal is strobed for a 50 ms period to complete an autozeroing operation of the force transducer signals A(AFTS)' and A(AFTFS). D(SD) and D(SR) are "ANDed" by AND GATE U30A, 1134 on FIG. 11 to provide D(SE), the START ENABLE signal which is necessary to commence the fast positioning mode.

FAST POSITION MODE SEQUENCE

Figure 2:
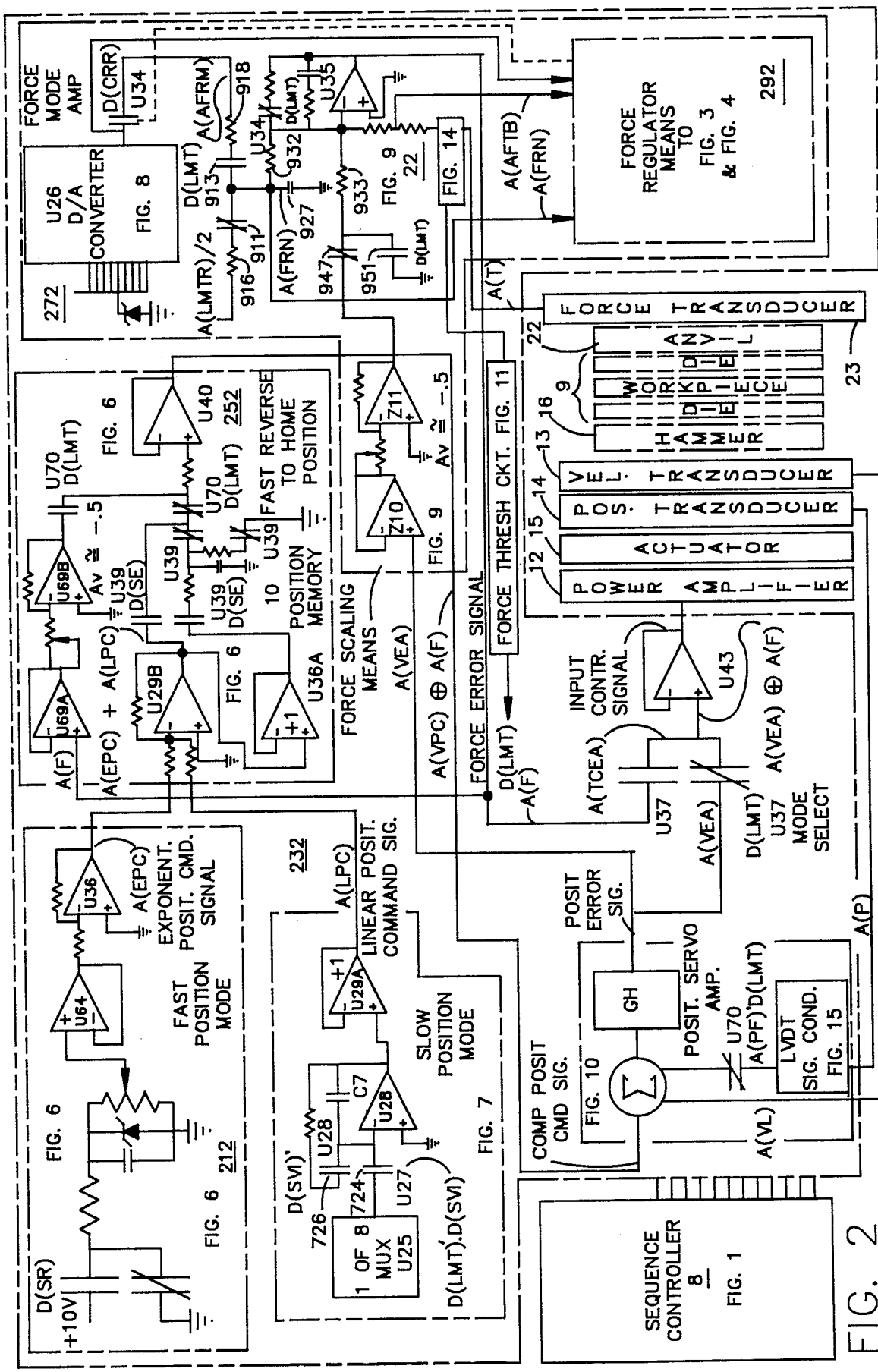
FIG. 2 is a block diagram of the invention, multi-mode force control circuit.

Referring to FIGS. 1 and 2, the fast position sequence is characterized to control the input control signal to power amplifier 12 to move the hammer 16 from a retracted position at high velocity to within a relatively short predetermined distance from the workpiece. Referring to FIG. 2, the multi-mode force control apparatus 1 fast position mode sequence is controlled by the simplified schematic circuit within MMFCC phantom block 212 and shown with greater detail in FIG. 6.

Referring to FIG. 5, and by way of example, the fast position mode sequence starts at time 0 and ends at time equal 60 milliseconds. The fast position mode sequence starts in response to the start enable signal D(SE) going from a false or low state to a high state. As the output of U30A goes high, logic signal D(SE) closes contact 16 of U33. Capacitor 630 charges via resistor 622 from the +10VREF voltage source.

The exponential charging network of resistor 622 and capacitor 630 provides a signal that controls the velocity and the position of the actuator assembly during the high velocity interval of the first position servo mode. The voltage on capacitor 630 rises until VZ1 breaks down and begins to clamp thereby preventing a further rise of voltage on capacitor 630.

The exponential position command voltage on capacitor 630 is characterized to increase exponentially from a zero voltage reference level. The capacitor is initially discharged by a 1K resistor via contact 618. The exponential position command voltage is scaled to correspond to a commanded hammer position and clamped by the 4.7 volt zener diode 632 at a clamped voltage value corresponding to a predetermined fast travel hammer limit position that is slightly short of contact with the workpiece.

The exponential position voltage is determined by the expression $+10*(1-e(t/(R622*C630)))$ in which the symbol ^ represent multiplication and the symbol represents exponentiation. The letter "e" represents epsilon.

Follower U64 buffers a portion of the signal on capacitor 630 and U36 inverts the signal and forms analog signal A(EPC). Analog signal A(EPC) is fed to a summing input of U29 at the upper right hand corner of FIG. 6. The inverted RC voltage transition is summed with an A(LPC) signal. U29 is a summing amplifier with unity gain. A(LPC) is still at zero volts at this time.

Comparator U38 688 compares the buffered exponential position command voltage, before inversion by amplifier U36B, with a predetermined reference voltage, such as the voltage from resistor divider 680, 682. The reference voltage is adjusted to have a value less than the clamped voltage value provided by zener diode 631 to provide a start slow traverse signal D(SST) for signalling the start of a slow position mode. The fast mode of travel is terminated when the anvil is approximately 0.020 inches from the workpiece. The total distance traveled to that time is approximately 0.50 inches. The time required to reach the clamp level is typically 0.060 seconds.

Figure 6:
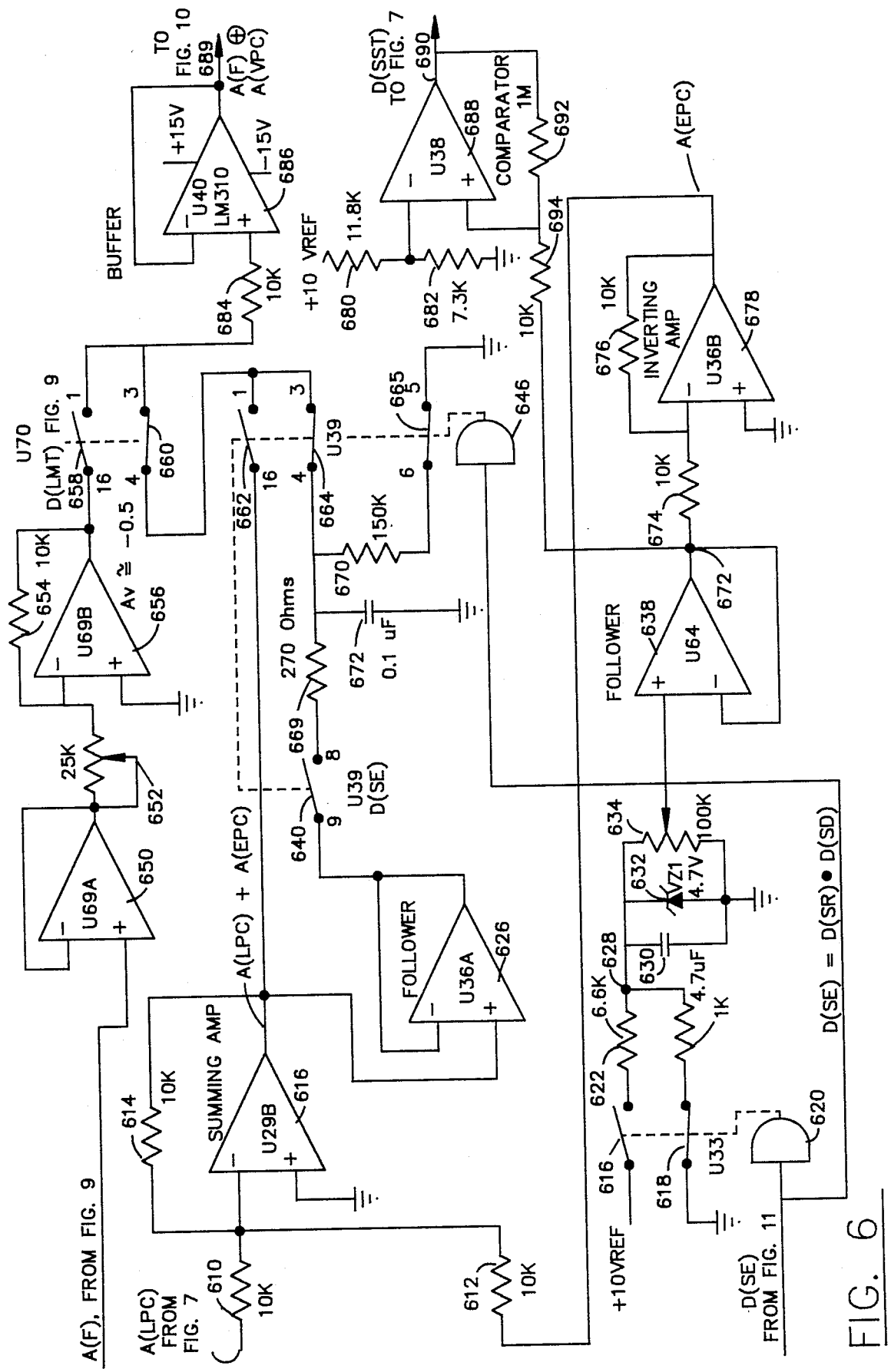
FIG. 6 is a schematic diagram showing the origin of the fast position command signal, the position memory circuitry, and the composite position command signal.

Referring to FIG. 6, the output signal from amplifier U40 is either A(F) or A(VPC) depending on the state of the D(LMT) term. The A(VPC) signal represents the composite velocity and position command signal. This signal is coupled directly to the POSITION SERVO AMPLIFIER shown on FIG. 10. The A(VPC) signal is 0.0 volts when the D(SR) logic signal is false, and rises in amplitude after D(SR) assumes a true or high state. The linear servo motor initiates motion immediately upon D(SR) going true. A linear motor is controlled by a servo amplifier such as a PWM or a conventional linear amplifier.

SLOW POSITION MODE

Referring to FIG. 6, the slow position mode is initiated by digital signal D(SST) 690 at the output of comparator U38. The U38 comparator responds to the voltage rise on capacitor 630 via adjustable resistor 634 and follower U64. The voltage rise on capacitor starts from an initial value of zero to a more positive level. As the output of U64 rises above a predetermined limit set by resistor 680 and resistor 682, the output of comparator U38, D(SST) goes high on signal line 690 and is shown connected to FIG. 7.

Referring again to FIG. 2, the simplified circuit within phantom block 222 represents a slow position mode circuit that is shown with greater particularity in FIG. 7. The slow position mode circuit of FIG. 7 responds to the digital slow velocity signal from the sequence controller n signal lines D(Q01)-D(Q21) into the 1-of-8 analog mux 718 and the start slow traverse signal D(SST) from the fast position mode circuit on FIG. 6.

A digital slow velocity signal is received from FIG. 13 on signal lines D(Q01)-D(Q21). The magnitude of this digital slow velocity is transmitted from the sequence controlled 8. The magnitude of the digital slow velocity signal establishes a reference current out of 1-of-8 MUX U25 718.

The slow position mode circuit is characterized to convert the digital slow velocity signal on signal lines D(Q01)-D(Q21) to an analog linear position command signal A(LPD). Amplifier U28 742, capacitor 734 and one of eight resistors selected by mux 781 via analog switch 726 represents a means for integrating and scaling the analog linear position command signal.

The rate of rise that is selected for the A(LPC) signal controls the final velocity of the hammer 16 as it contacts the workpiece so this velocity must be set to correspond to the step response of the force transducer 23 and the magnitude of the ultimate force signal set point, i.e. the larger the force set point, the greater the velocity can be as the hammer contacts the workpiece and not have a force overshoot condition. A variable slow velocity signal provides the capability for decreasing cycle times with an increase in the ultimate force signal.

Referring to FIG. 5, the slow position mode sequence extends typically from time equal 60 milliseconds to time equal 180 milliseconds. The slow position mode sequence starts with D(SST) going from a false state 526 to a true state 528 and ends as D(SST) returns to a false state at falling edge 550.

1-of-8 MUX U25 718 selects one of the eight input resistor for connection via the analog switch contact 724 to the inverting input of integrator U28. The 1.2 V REF is a precision reference. The voltage across the resistor selected is predetermined, therefore, the current into the inverting input node of U28 is predetermined and fixed.

The output of the integrator U28 is a negative going ramp. The output of U29A buffer is a negative going ramp voltage. The inverting input of U28 is a virtual ground. A fixed predetermined current passes through the selected resistor since the voltage across it is fixed. The integrator amplifier U28 moves the output voltage in a negative direction at a rate sufficient to maintain constant current into the integrating capacitor 730. The fixed current controls the slope of the voltage out of U28. The larger the current magnitude, the greater the slope out of integrator U28, 742 with respect to time.

Figure 10:
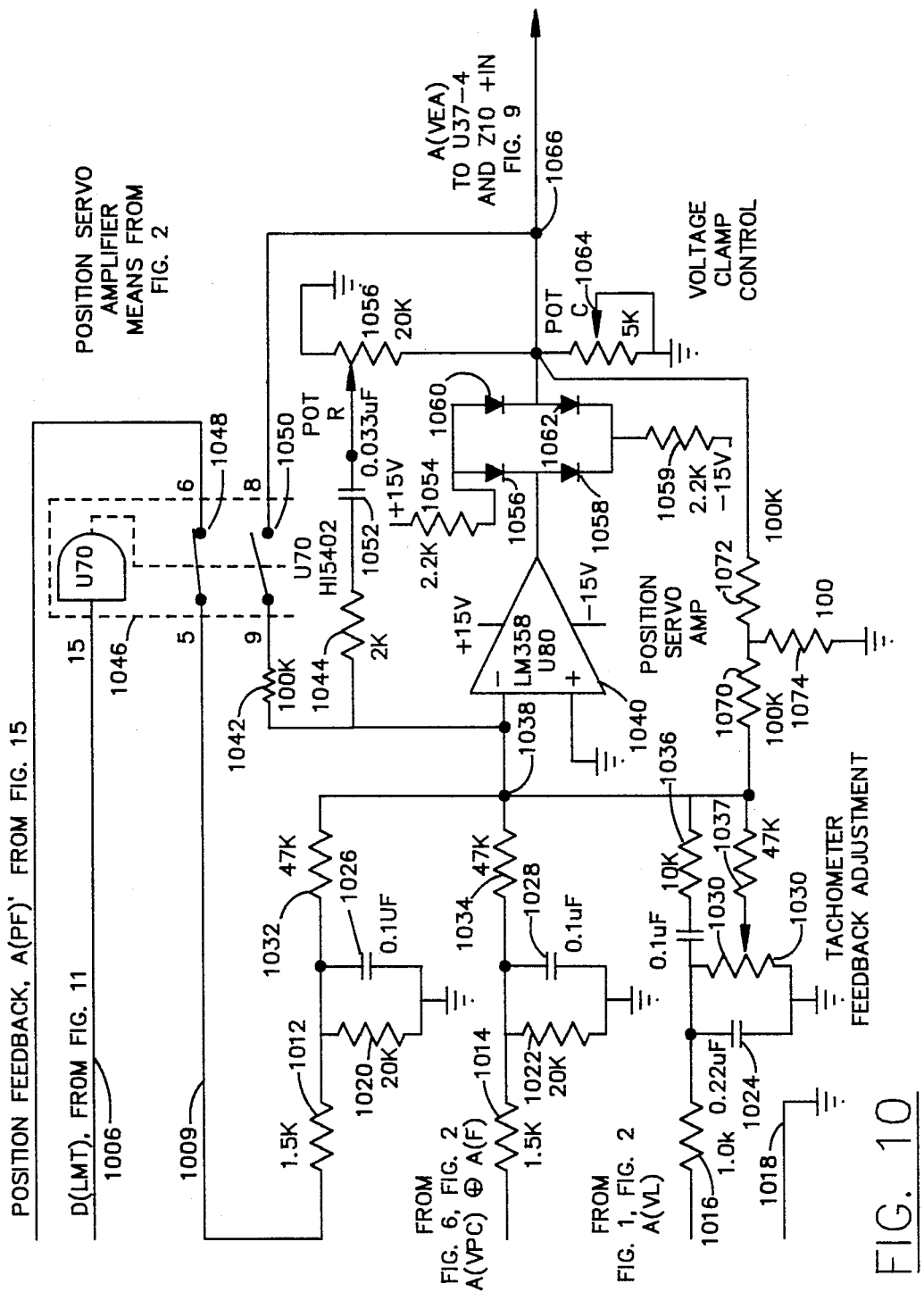
FIG. 10 is a schematic diagram showing the position error amplifier and its compensation circuitry.

The output signal of U40 is the composite position command signal that is fed to the position servo amplifier of FIG. 10. The position servo amplifier is also shown in the system drawing of FIG. 2. The invention MMFCC is adjusted to provide the maximum velocity that the mass of the motor will permit while maintaining stable position mode operation by adjusting the time constant of the 630 capacitor. The A(LPC) signal represents a component of a composite first position servo mode command signal A(VPC). The origin of the A(LPC) signal is FIG. 7.

The slow position mode sequence is characterized to control the input control signal A(TCEA) to the power amplifier 12 to move the hammer 16 at a low velocity into contact with the workpiece 9 in response to the digital slow velocity signal to MUX U25 on FIG. 7. After the hammer 16 reaches and touches the workpiece, the multi-mode force control circuit 10 is further characterized to gradually increase the amplitude of the actuator control signal A(DA) in accordance with a predetermined voltage versus time relationship to gradually increase the force applied to the workpiece interposed between the die 1, 17 and die 2, 21.

The slow position mode sequence is followed by a force rise mode sequence in response to the force transducer force signal exceeding the force threshold reference signal. The slow position mode sequence ends with the occurrence of the D(LMT) signal as shown in FIG. 7. The output of inverter U31 goes false as D(LMT) goes true. The D(LMT) signal originates on FIG. 11 and will be described in connection with the FORCE CONTROL MODE.

POSITION MEMORY MEANS

Referring to FIG. 2, circuitry within phantom block 252 and including summing amplifier U29A, represents a means for summing the linear position command signal and the exponential position command signal to form a composite position command signal.

The means for summing the linear position command signal and the exponential position command signal to form a composite position command signal and the position memory means circuit are shown in detail in FIG. 6. Follower U36A couples the composite position command signal to the position memory means circuit, also shown on FIG. 6.

Referring to FIG. 6, during normal operation, composite position command signal information is passed from summing amplifier U29B, 616 via D(SE) contact 662 and is "ANDED" with D(LMT) contact 660 to the input of follower U40. A loss of signal to the U40 follower results in a loss of the input control signal to power amplifier 12. The position memory circuit provides for continuity in the composite position command signal to the U40 follower because the composite position command signal is being constantly duplicated on capacitor 672 from which the signal is coupled to U40 in the event of loss of the D(SE) term.

The memory means circuit receives the composite position command signal via follower U36A and analog switch contact U39-9,8, 640. The analog contact closes as a function of logic level D(SE), discussed in connection with FIG. 11 and the start signal D(SR) from the sequence controller at the start of each machine cycle.

As the invention apparatus 1 advances through the fast position mode and the slow position mode, the U39 contact 640 remains closed and couples the composite position command signal onto capacitor 672 through a 270 ohm resistor 669. Capacitor 672 stores the composite position command signal during the the fast position mode and the slow position mode, and discharges the composite position command signal at a predetermined rate in response to termination of the discrete start signal D(SR). Loss of the discrete start signal D(SR) opens the 640 contact and closes the U39 665 contact. The closure of the 665 contact provides a discharge path for the composite position command signal on capacitor 672 at the start of the retract mode.

The position memory circuit is represented by capacitor 672, resistors 669, 670 and U39 contacts 640, 664, 662 and 665. By providing a duplicate analog level characterizing a duplicate of the composite position command signal, A(VPC) the position memory circuit serves to protect the system from damaging the workpiece in response to momentary power interruptions or unanticipated interruptions in signal from the sequence controller 8.

Referring to FIG. 6, follower U36A, 626 tracks the output voltage of SUMMING AMP U29B, 616. The output of U29B represents the desired position of the hammer in relation to the reference frame retracted position 26. The voltage out of U29B and the identical voltage out of U36A have the dimensions of volts/inch.

Analog switch U39-9,8 closes in response to D(SE), the START ENABLE signal. The voltage on memory capacitor 672 tracks the voltage out of follower 626. Resistor 671 adds a slight delay and is necessary to protect the analog switch contact against overstress due to high current. The voltage on the capacitor represents the position of the hammer. If the sequence controller 8 inadvertently changes the state of the D(SR) term to the MMFCC or a transient interrupts power momentarily, the voltage on capacitor 672 provide a value equivalent to the last known position of the hammer.

Resistor 670 provides a discharge path for capacitor 672 during the retract mode. The restore mode is started by loss of the D(SE) signal as a result of the sequential controller resetting the D(SR) signal at the end of the force hold mode time interval. As D(SE) transfers from a high to a low level, U39 6,5 closes providing a discharge path for the capacitor 672 via resistor 670.

The D(LMT) signal also controls the position memory means circuit of FIG. 6 by terminating the voltage rise on capacitor 672 via "AND" gate U30C 722 with the signal D(TST) terminating slow traverse on FIG. 7. The D(LMT) signal is reset by the termination of D(SR) as shown on FIG. 11. Transferring D(LMT) from a high to a low resets the U37 4,3 mode select contact shown on FIG. 9 and on FIG. 2. Closure of this normally closed contact restores the MMFCC from the force versus time or force hold mode shown in FIG. 5 to a retract mode in which the discharge of the voltage on capacitor 672 via resistor 670 controls the position and velocity of the hammer as it is returned to the home position.

FORCE THRESHOLD CONTROL, D(LMT)

Figure 11:
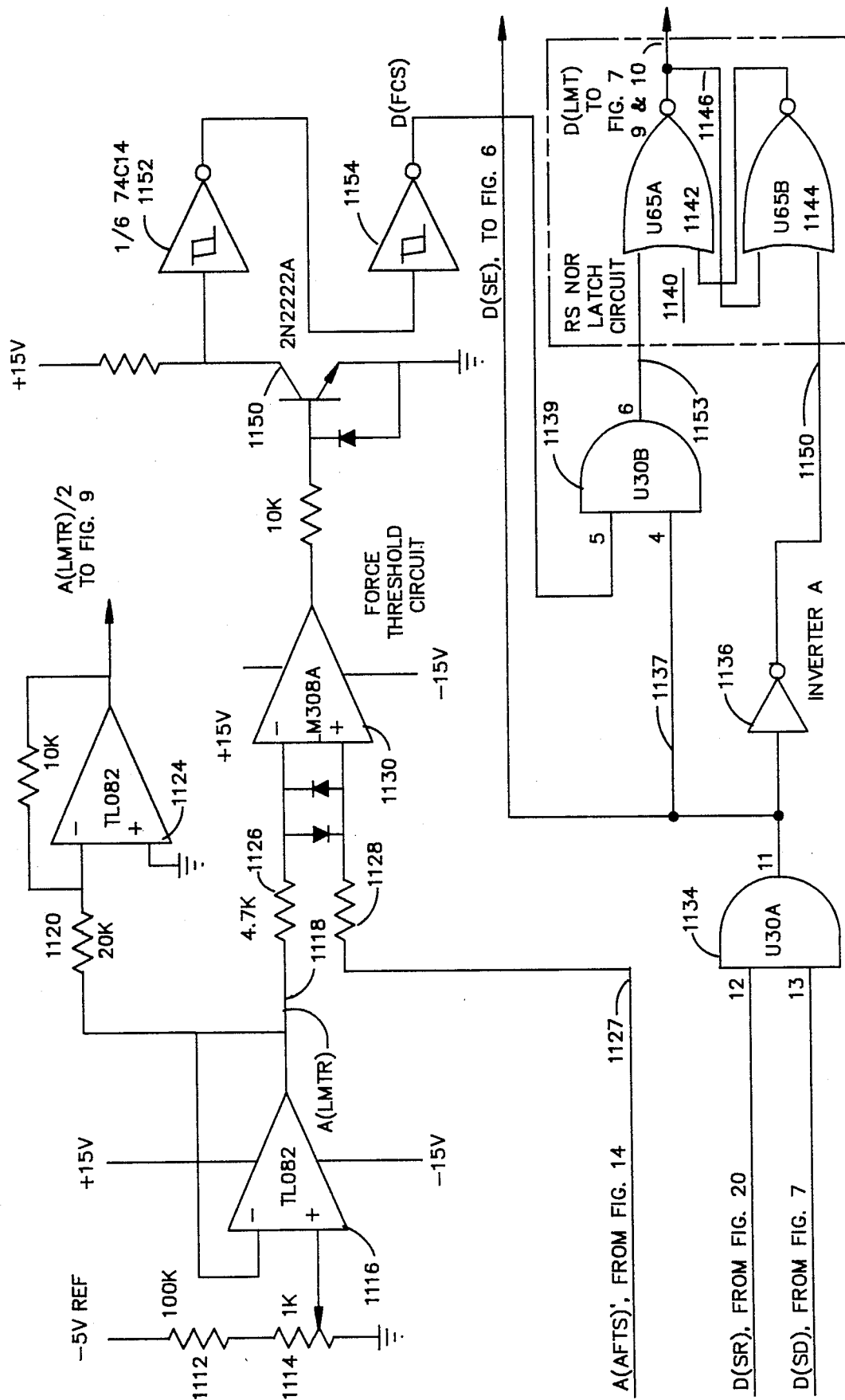
FIG. 11 is a schematic diagram showing the force threshold detector circuit and the origin of A(LMTR)/2, D(LMT), D(FCS) and D(SE) signals.

Referring to FIG. 11, resistor string 1112 and 1114 in combination with buffer amplifier 1116 provide a force threshold reference signal A(LMTR) 1118 as an input to resistor 1126 to characterize the minimum level of force t be applied to the workpiece 9 by the die 1 17 and backed by die 2 21, anvil 22 and force tranducer 23 referenced to frame 7 to produce a voltage level out of transducer 23 required to indicate contact with the workpiece.

Referring to FIG. 11, comparator 1130 represents a force threshold detection means responsive to the amplified force transduer signal A(AFTS)' from FIG. 14 and to a predetermined force threshold reference voltage level such as the A(LMTR)' signal corresponding to a predetermined force threshold level of ten millivolts which equates to approximately 50 grams from follower 1116 for providing a logic signal having a true state or a false state titled latch mode transfer signal D(LMT).

The force threshold circuit requries that the A(AFTS)' signal to resistor 1128 exceed the A(LMTR)' signal by approximately 1 millivolt. The purpose of the D(LMT) term is to signal the moment that the die 1 contacts the workpiece and applies a force that exceeds a predetermined threshold.

The D(FCS) signal from schmitt inverter 1154 changes from a false to a true state concurrent with the amplified force transducer signal A(AFTS)' exceeding the predetermined force threshold reference voltage level A(LMTR)'. The D(FCS) logic signal changed from a true to a false state in response to the predetermined force threshold reference voltage level exceeding the amplified force transducer signal A(AFTS)'.

The D(LMT) term is an otuput of the RS NOR LATCH circuit on FIG. 11. The threshold for the D(LMT) term is established by adjusting resistor 1114 to obtain the required voltage. Follower 1116 buffers the adjusted threshold level A(LMTR)' and provides this output signal to the input of comparator 1130 and to the input terminal of resistor 1120.

Referring to FIG. 11, resistor 1114 is adjusted to set the negative value of the A(LMTR)' signal to a value representing the actual force to be applied by the hammer to the workpiece at the instant the system transfers from a position to a force mode of operation. Inverting amplifier 1124 has a gain of −0.5 to provide the A(LMTR)/2 signal to the summing input of amplifier U35 via U37-5,6.

Figure 9:
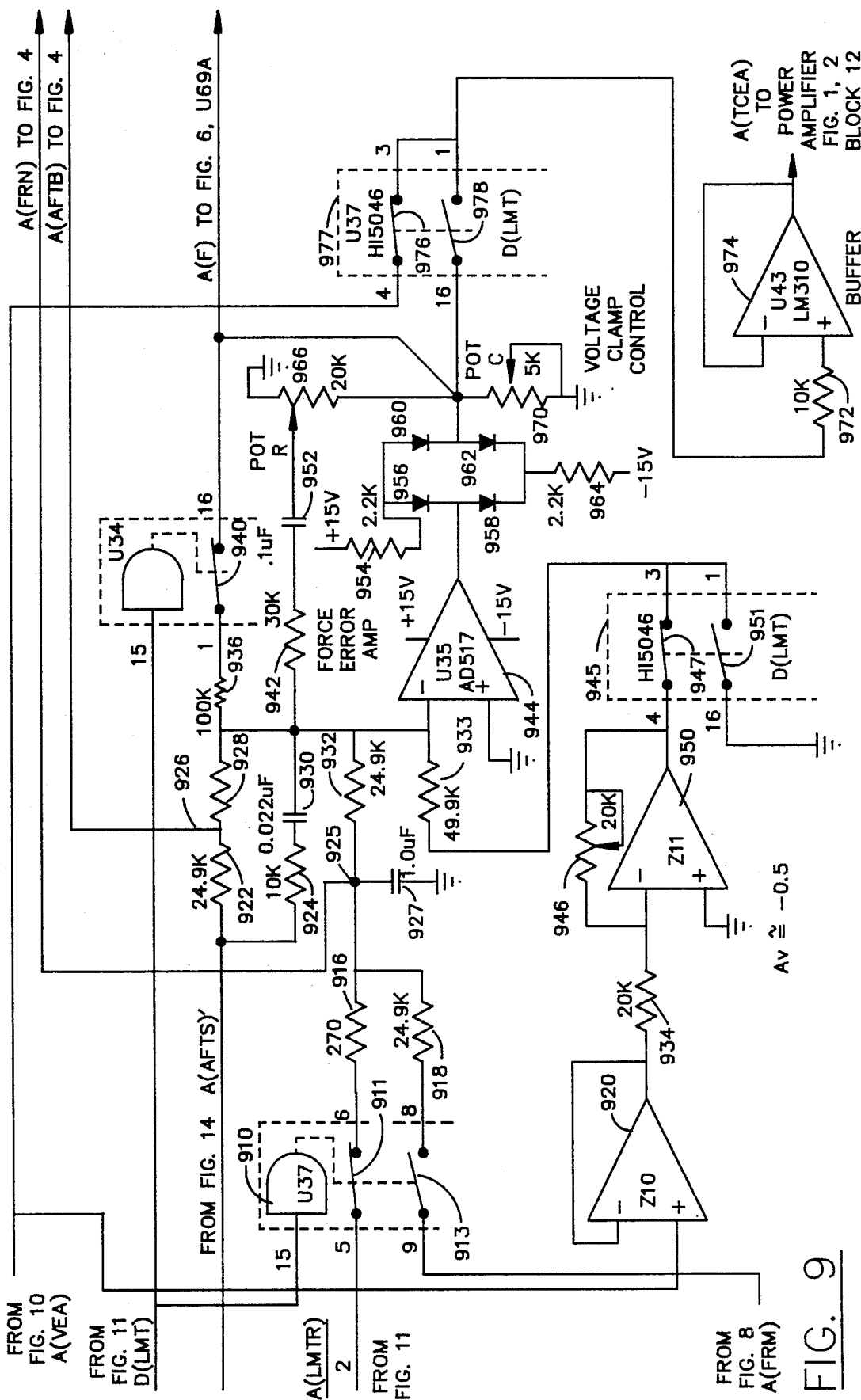
FIG. 9 is a schematic diagram showing the force error amplifier and its compensation circuitry and the origin of A(TCEA), input control signal.

Referring to FIG. 9, the A(LMTR)/2 is a positive reference input voltage to node 925 via contacts U37-5,6 and resistor 916. The values of A(LMTR)/2 and A(AFTS)' in cooperation with the values of resistors 922, 928, 932 are set to obtain cancellation and a net input voltage of zero volts at the negative input terminal of U35 at the moment of transistion from a position to a force mode D(LMT). Cancellation of these two opposite polarity signals at the negative input of U35 results in a substantially zero volt force error signal contribution out of U35 at the instant of transition, i.e. D(LMT) time.

The adjusted level of the signal out of resistor 1114 is a negative voltage. Comparator 1130 receives the threshold voltage reference via signal line 1118 and resistor 1126 at its inverting input. Signal A(AFTS)' is received on signal line 1127 from FIG. 14 A(AFTS)' is the conditioned analog signal that characterizes the force being applied to the force transducer 23.

As the force applied to the transducer 23 exceeds the force threshold established by the voltage from resistor 1114, the output voltage from comparator 1130 goes low turning transistor 1150 off and allowing the collector voltage to go high. Schmitt inverters 1152, 1154 double complement the voltage rise from the collector to provide a positive leading edge voltage to the input of the RS NOR LATCH 1140 at input 1153. The RS LATCH sets in response to the positive edge of the input signal on 1153 and provides a high output level on signal line 1146 to represent the D(LMT) signal. The output out of the second inverter 1154 is designated as the force comparator signal D(FCS). D(LMT) assumes a true state concurrent with the D(FCS) term going from a low to a high.

FORCE RISE MODE

The force rise mode is characterized to control the input control signal to the power amplifier 12 to increase the actuator control signal to increase the force applied by the actuator 15 via the hammer to the workpiece interposed between the hammer and anvil in accordance with a predetermined force versus time relationship. The actuator used in the preferred embodiment is a model ML5-2908-314A made by Norther Magnetics Inc. of Van Nuys, CA, 91406. The power amplifier used was a model SD 412 made by Servo Dynamics Corp. of Northridge, CA. 91324.

Referring to FIG. 2, the circuitry within phantom blocks 272 and 292 in combination represent a circuit for controlling a force rise mode sequence. The circuitry for the control of the force rise mode sequence is variously shown on FIG. 9, FIGS. 3, FIG. 4 and FIG. 8. Referring to FIG. 5, and by way of example, the force rise mode sequence for this embodiment starts at time equal 180 milliseconds and ends approximately at time equal to 300 milliseconds.

Figure 3:
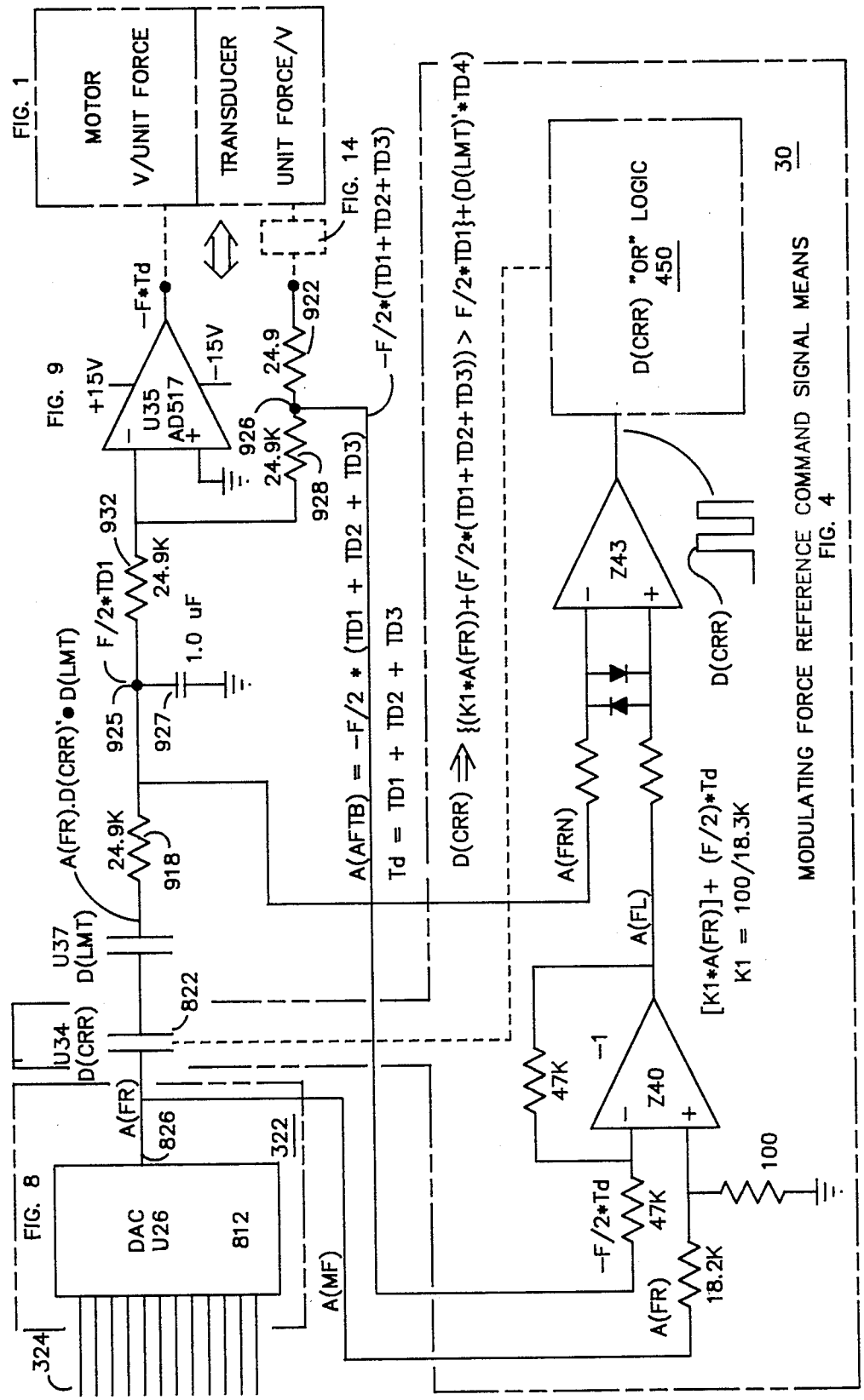
FIG. 3 is a functional schematic diagram showing the mechanization of the FORCE REGULATOR circuit within the invention multi-mode force control circuit.

Referring to FIG. 3, DAC U26, 812 within phantom block 322 represents a force reference command signal means responsive to the digital ultimate force signal from the sequence controller 8 via twelve (12) input bus lines 324 for converting the digital ultimate force signal to an analog force reference command signal A(FR) on signal line 826.

Figure 8:
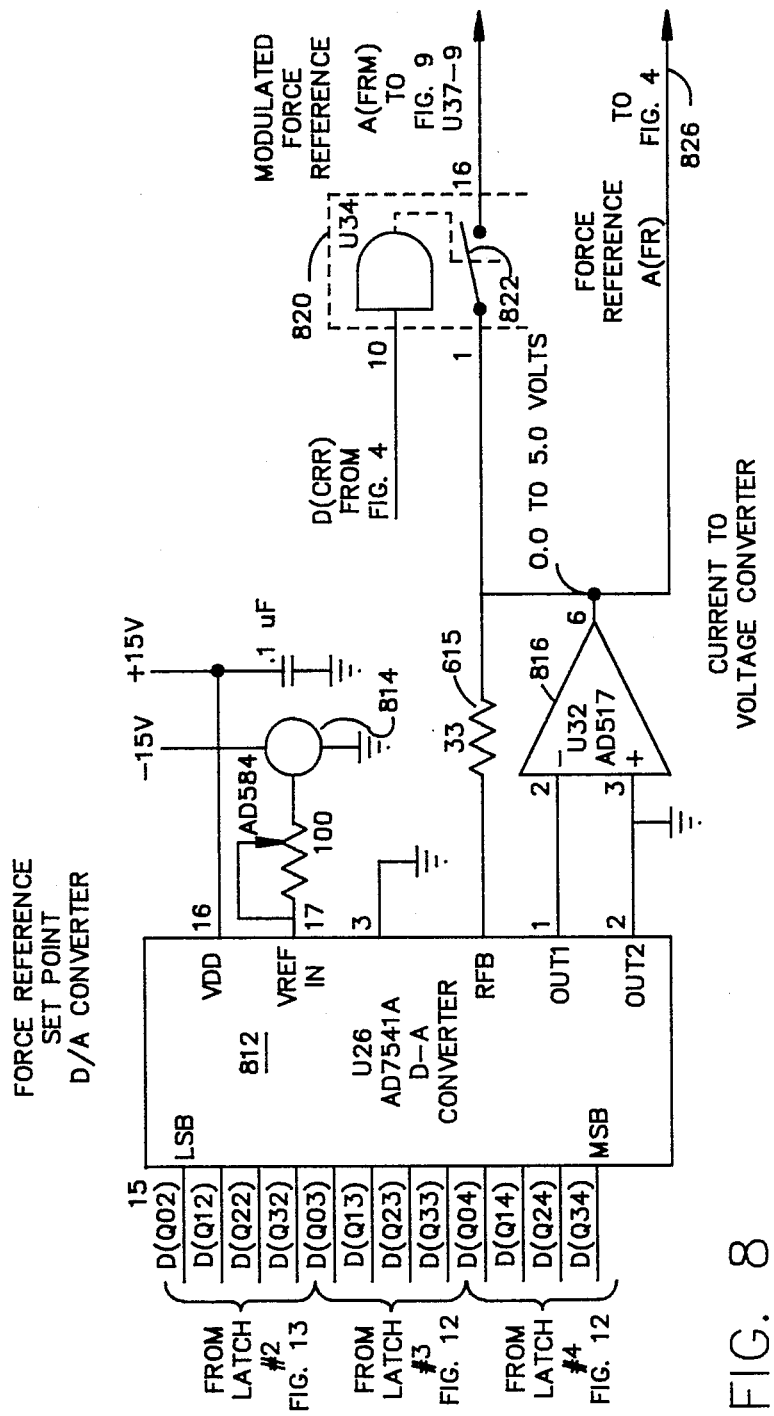
FIG. 8 is a schematic diagram showing the origin of the ultimate force reference set point and modulated force reference.

The electrical features of this circuit are shown in greater detail on FIG. 8. The force reference command signal means applies the analog force reference command signal A(FR) to storage capacitor 927 via input resistor 918 to form the force reference command signal A(FRN) on capacitor 927 having a predetermined time dependent characteristic selected to represent a required predetermined time dependent force.

Referring to FIG. 9, U35 and its related circuitry, represents a force mode amplifier circuit responsive to the inverted scale amplified force transducer signal A(AFTS)' coupled from FIG. 14 to FIG. 9 and applied to input resistor 922.

The U35 force mode amplifier 944 is also responsive to the force reference command signal A(FRM) applied to capacitor 927 for providing a force error signal corresponding to the required predetermined time dependent force.

MODULATING FORCE REFERENCE COMMAND SIGNAL MEANS

Referring to FIG. 3, the circuit within phantom block 30 represents a modulating force reference command signal means for interrupting the analog force reference command signal A(FR) in response to random reduction of applied force to the workpiece in excess of a predetermined margin force A(MF) resulting from random reduction in workpiece compliance,. Block 30 is also shown in FIG. 2. Interruption of the analog force reference command signal A(FR) interrupts the predetermined rise of the force reference command signal.

The term TD1 on FIG. 3 represents the time constant of the force RC network comprised of resistor 918 and capacitor 927 as shown in detail in FIG. 9. Capacitor 927 is referred to as the force reference command signal capacitor. The term TD2 represents the mechanical time constant of the actuator 15 and the mechanical time constant of force transducer 23. The term TD3 represents a time delay related to the time required to do work on the workpiece.

Analog switch U34 contacts 1, 16 822 represents an interruption means responsive to a force modulating signal D(CRR) from "OR" LOGIC block 450. The circuit for this block is shown in greater detail in FIG. 4. The interruption means interrupts the analog force reference command signal A(FR) in accordance with the workpiece variable compliance. For example, as the workpiece crumples under the force of the hammer via the dies, the compliance drops momentarily reducing the force sensed by the force transducer. Loss of force on the transducer results in a drop of the amplified force transducer signal A(AFTB).

The interruption means U34 contacts 822 provides a modulated analog force reference command signal A(FRM) to an input resistor 918 first terminal. The second terminal of the input resistor is coupled to a force reference command signal capacitor such as capacitor 927. The modulated analog force reference command signal A(FRM) is filtered by the force reference command signal capacitor to form the force reference command signal A(FRN) on the force reference command signal capacitor 927.

The modulating force reference command signal means 30 is also responsive to the scaled amplified transducer signal A(AFTB) on FIG. 3 and FIG. 9, node 926 and a predetermined ratio of the analog force reference signal for controlling the modulation duty cycle of the modulated analog force reference command signal A(FRM) to control the amplitude of the force reference command signal on capacitor 927. The amplitude of the force reference command signal A(FRM) is a predetermined time dependent voltage corresponding to a predetermined time dependent force in response to the D(CRR) term being true, i.e. high, to keep the U34 1,16 contact 822 closed.

The force mode amplifier U35 is responsive to interruption of the continued rise of the force reference command signal to prevent overshoot of the force error signal thereby preventing overshoot of force applied to the workpiece.

Referring to FIG. 9, and FIG. 2, U37 977 contacts 4, 3 and 16, 1 represent an output switching means responsive to the latch mode transfer signal D(LMT) for selecting the force error signal for the input control signal, and for selecting the position error signal for the input control signal in the absence of the latch mode transfer signal.

As shown in FIG. 5, the force rise mode is followed by the force hold mode starting at approximately 300 ms, 563 and ending at 5.0 s, 596.

FORCE HOLD MODE

Figure 16:
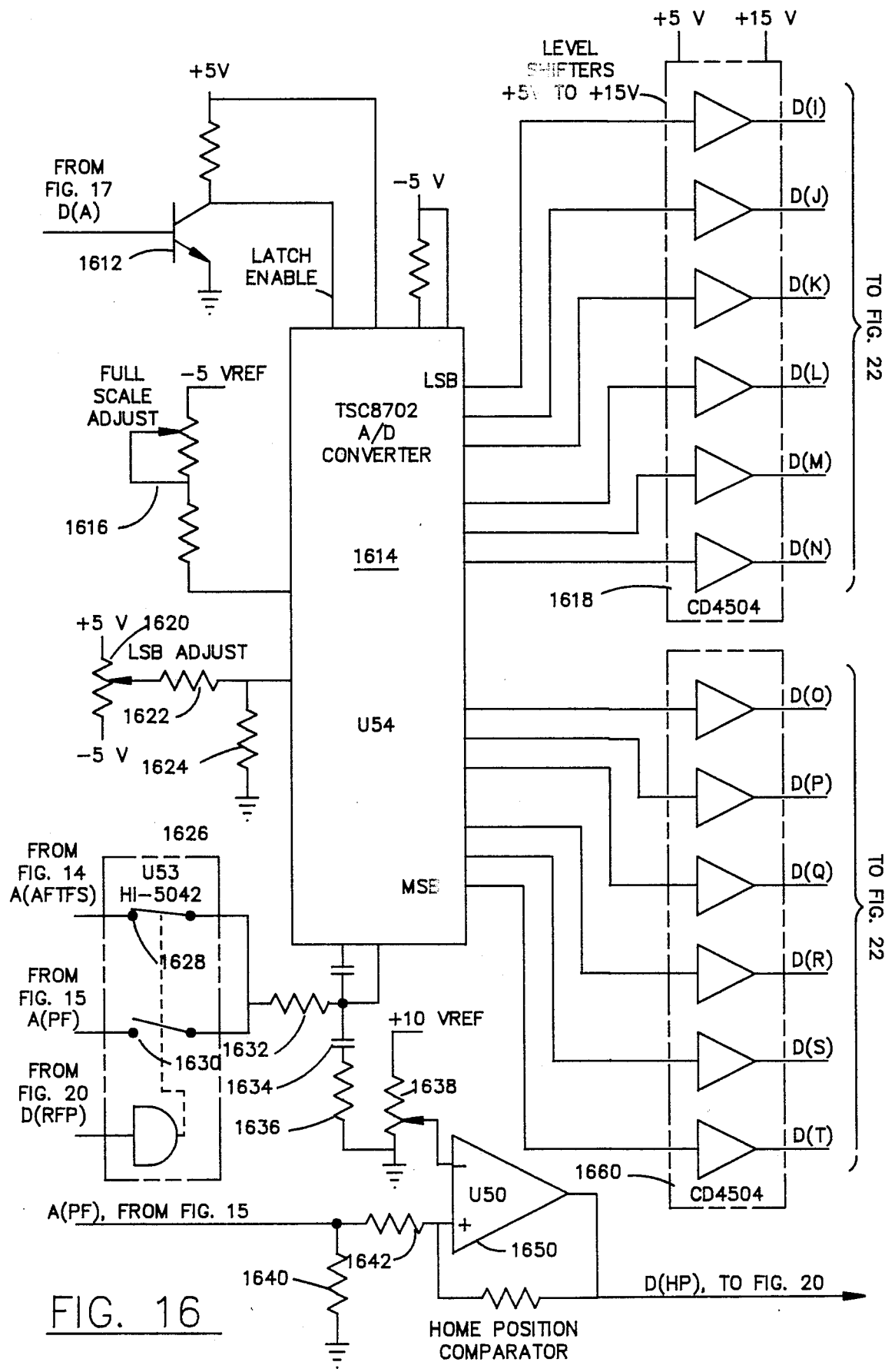
FIG. 16 is a schematic diagram showing an A to D converter circuit, used to translate the analog force and position signals into a digital medium, for use by the sequence controller.
Figure 22:
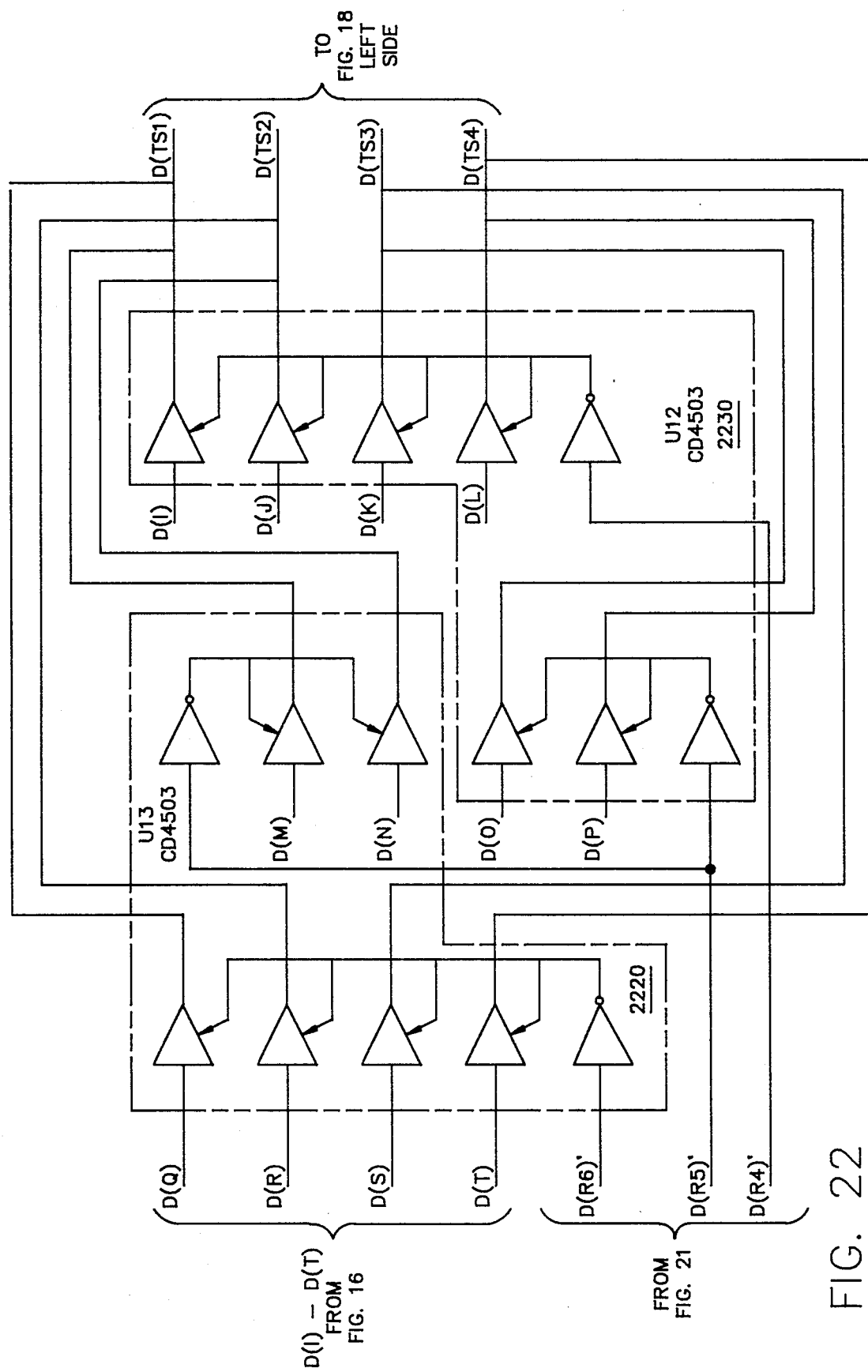
FIG. 22 is a schematic diagram showing a twelve line to four line multiplexer, comprised of tri-state buffers.

The A/D CONVERTER 1614 of FIG. 16 is supplied by Teledyne Semiconductor Corp. of Mountain View, CA. It is used to convert analog signals such as A(AFTFS) or A(PF) into their respective digital values via analog switch 1626, representing force in the force control mode and position in the position control mode to digital values. The outputs of the A/D CONVERTER 1614 is fed to CD4504 level shifters 1618, 1660 for subsequent transmission to tri-state buffers on FIG. 22, then to optical couplers 1820 for output to the output data bus shown FIG. 18 for transmission to the sequence controller.

The sequence controller monitors the digital value of the amplified force transducer force signal A(AFTFS). The A(AFTFS) signal is developed on FIG. 14 and is coupled to the digitizing circuitry of FIG. 16 from where its digital value is forwarded to the sequence controller 8. The sequence controller compares the digitized value of the A(AFTFS) signal with the digital value of the ultimate force and when the digital value of the force control signal equals or exceeds the predetermined digital value of the utlimate force, the sequence controller 8 starts the internal timer to measure the force hold interval. The force hold mode ends when the time allocated for its is exceeded, after which the sequence controller advances the system to the retract mode.

The force hold mode is terminated by the sequence controller 8 determining that the force has been applied to the workpiece 9 for a sufficient period of time after initiation of the force hold mode start signal within the sequential controller 8. The sequential controller terminates the force hold mode by resetting the D(SR) term which terminates and resets the D(LMT) term. Loss of the D(LMT) term coupled with loss of the start signal results in the start of the retract mode. Loss of the D(LMT) term returns the mode select switch to a position servo configuration.

Termination of the force hold mode is followed by a retract mode in response to the sequence controller resetting the start signal D(SR). The reset mode returns the hammer to the retract position. In the present embodiment, the position of the hammer is monitored by the sequence controller via the MMFCC. The position transducer and circuit of FIG. 15 send signal A(PF) to FIG. 16 for digitization via contact 1630, resistor 1632 by A/D CONVERTER 1614. The digital value of the position is coupled to the sequence controller.

RETRACT MODE

Referring to FIG. 2, phantom block 252 shows a simplified schematic of a fast reverse to home circuit that comprises U39 normally closed closures. The fast reverse to home circuit is shown in greater detail in FIG. 6. Capacitor 672 stores a voltage representing the position of the hammer. Upon loss of D(LMT), i.e. D(LMT) going false, the analog switch closures represented by U39 665 assume the state shown in FIG. 6. The voltage stored on capacitor 672 is discharged via resistor 670 through contact 665 to ground. As the voltage is discharged, the composite position servo amplifier follows the signal via contact 664. As the hammer reaches the home position, D(HP) is developed by comparator U50 1650 on FIG. 16 to indicate that the hammer has reached home position.

Referring to FIG. 16, the term D(RFP) represents a logic level that is true when the sequence controller requires that the multi-mode force control circuit read the position of the hammer with respect to its home position and communicate a digital value representing the position of the hammer to the sequence controller for comparison with known values such as the value representing the absolute extent of the hammer possible for the particular actuator and hammer being employed. The sequence controller is typically following a sequential program and knowing the location of the hammer makes it possible for the sequence controller to constantly monitor the positioning and force control process for errors.

HOME POSITION SIGNAL

Figure 15:
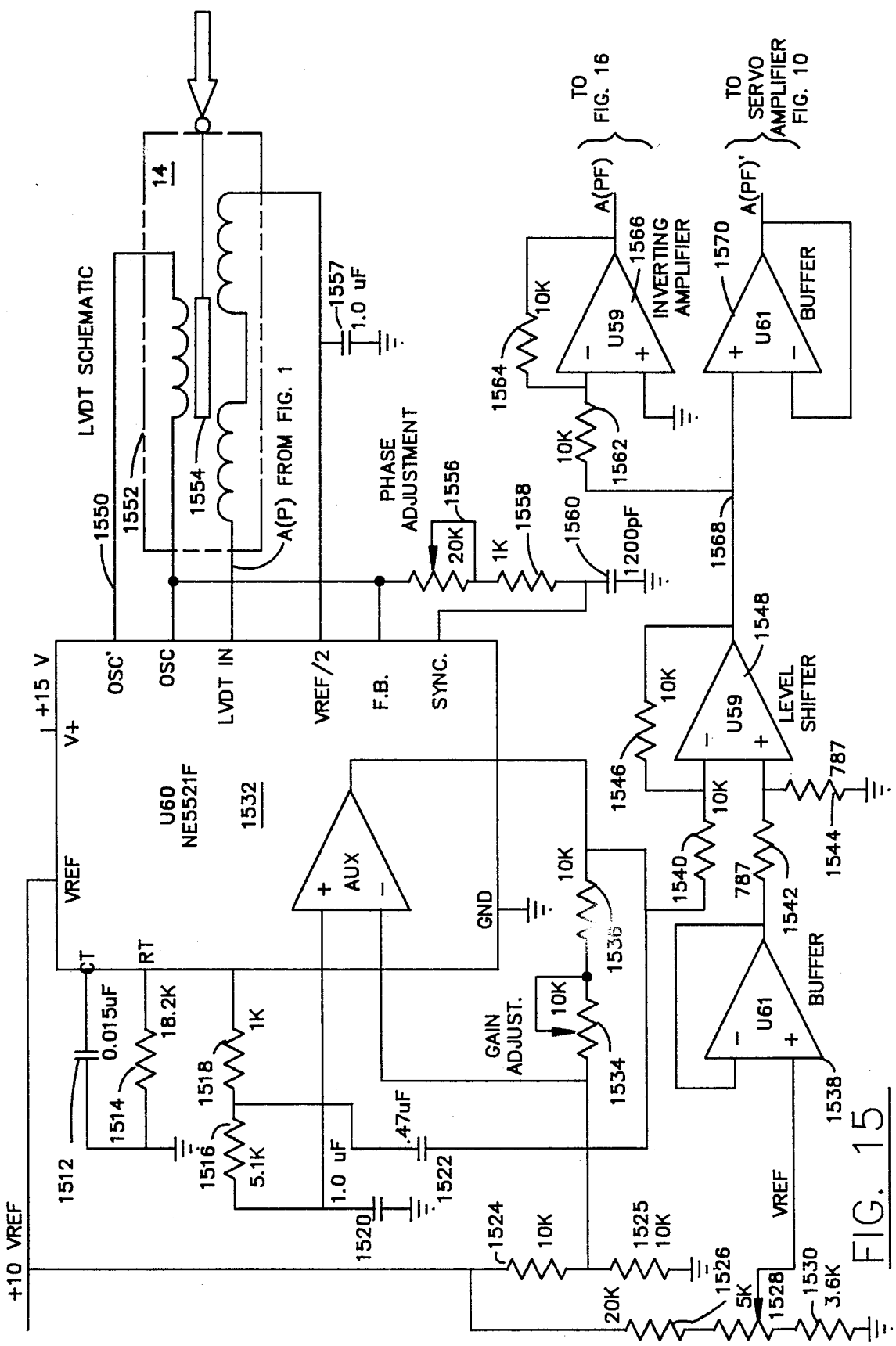
FIG. 15 is a schematic diagram showing the position transducer signal conditioning circuit.

FIG. 16 shows that D(HP) is developed by the comparator U50 monitoring analog signal A(PF) from FIG. 15. A(PF) is an analog signal that represents the position of the hammer in relation to the reference or home position. Resistor 1638 and the precision +10 VREFF signal are used to establish a precise reference to the inverting input of U50 to define a limit which is A(PF) falls below, establishes that the hammer has been returned to the home position.

The sequence controller 8 receives the discrete home position signal D(HP) from the MMFCC via circuitry such as that associated with comparator U50 on FIG. 16 or in the alternative, from the actuator via a limit switch to indicate that the hammer is fully retracted.

POSITION SERVO AMPLIFIER

The circuit of FIG. 10 represents a position servo amplifier for summing the damping signal A(VL), the conditioned position signal A(PF)' and the composite position command signal to A(VPC) to provide a position error signal A(VEA) to FIG. 9.

The velocity signal A(VL) is received from the velocity transducer 13 directly. The velocity transducer used in the preferred embodiment was a model 6L1 from the Schaevitz Co. of Pennasauken, N.J., phone (609) 662-8000. The A(VL) signal provides rate damping for proper servo operation during the position modes. The velocity transducer is coupled to actuator 15 via shaft 2a. The A(VL) signal is a voltage that is proportional to velocity.

The signal from the velocity transducer is polarized. The polarity of the A(VL) signal to FIG. 10 is reversed with a change in direction of the actuator. The velocity signal A(VL) is fed to the position servo amp via resistor 1016.

The resistor, capacitor network 1036 across resistor 1037 provides a phase lead signal component of the A(VL) velocity signal to the position servo amplifier U80, 1040. The variable resistor 1030 is adjusted to critically damp the positioning servo modes as to minimize position overshoot and position following error in reference to the composite command signal A(VPC).

The position signal A(PF)' is received from FIG. 15 and coupled to the position servo amp via resistor 1012. The position transducer 14 is coupled to actuator 15 via shaft 2b as shown on FIG. 1. The output signal A(P) is coupled to FIG. 15 for conditioning to provide signals A(PF) and A(PF)', as explained under the section titled POSITION TRANSDUCER SIGNAL CONDITIONING.

The primary feedback loop around amplifier U80 is comprised of a variable resistor 1056, capacitor 1052 and resistor 1044. The capacitor, resistor network provides compensation of the system break frequencies as they apply to a bode plot. The variable resistor 1056 adjusts the gain of the system servo loop for best response without oscillation.

The secondary feedback loop around amplifier U80 is comprised of resistors 1070, 1072 and 1074. The network provides forward loop compensation in the positioning mode as the actuator is stationary or is moving with constant velocity.

The output of the position servo amp on FIG. 10 is clamped by a bridge diode network. Clamping this drive signal protects the power amplifer 12 and actuator 15 form overdrive damage. The drive limits are set by adjusting the voltage clamp control 1064.

INPUT CONTROL SIGNAL MATCHING MEANS

Operation of the control signal matching means circuit permits the output signal of the force error amplifier A(F) U35 to match the output signal A(VEA) of the servo amplifier U80 within the position servo amplifier characterized by FIG. 10.

Operation of the control signal matching means circuit permits the output signal A(VEA) of the servo amplifier U80 within the position servo amplifier characterized by FIG. 10 to match the force error signal at the output signal of the force error amplifier A(F) U35.

The matching means prohibits the power amplifier 12 from seeing an abrupt change in the input control signal level resulting in a smooth transition from a position to a force mode and from a force to a position mode in operation.

Referring to FIG. 2 and more particularly to FIG. 9, amplifiers Z10, Z11, and analog switch 945 and to FIG. 6, amplifiers U69A, U69B and analog switch U70, 658 in combination represent an input control signal matching means for matching the instantaneous amplitude of the force error signal A(F) at the output of U35 to the position error signal A(VEA) at the output of the position servo amp FIG. 10 and via follower U43 to be coupled as the input control signal to the Power Amplifier 12 input prior to the latchmode transfer signal D(LMT) changing from a false state to a true state.

The input control signal matching means also matches the instantaneous amplitude of the position error signal A(VEA) at the output of the position servo amp shown on FIG. 10 to the force error signal A(F) at the output of the U35 force error amplifier, the force error signal being coupled to the input control signal via follower U43 prior to the latchmode transfer signal D(LMT) changing from a true to a false state.

Referring to FIG. 2, amplifiers U69A and U69B represent a position scaling means within the input control signal matching means that is responsive to the force error signal A(F) from the output of U35 for scaling and matching the force error signal to provide a scaled position error signal at the output of U69B via contact 658 to the input of amplifier U40 686.

Amplifier U40, a shown in greater detail in FIG. 6 represents a composite position error amplifier having an input terminal, and an output terminal. The composite position error amplifier U40 is coupled to provide the composite position command signal or the scaled position error signal to the input terminal of the position servo amplifier.

Analog switch U70 represents a position signal switch for selecting the scaled position error signal in response to the latch mode transfer signal D(LMT) and for selecting the composite position command signal in the absence of the latch mode transfer signal;

U40 686 composite position error amplifier has unity gain. Its input terminal is coupled via resistor 684 to receive the signal selected by the position signal switch U70. The output terminal of U40 is coupled to buffer and provide the composite position command signal or the scaled position error signal selected by the position signal switch to the input terminal of the position servo amplifier;

The force scaling means of Z10 920 and Z11 950 as shown on FIG. 9 is responsive to the position error signal A(VEA) from the output of the position servo amplifier of FIG. 10. The force scaling means scales and matches the position error signal applied to the positive input of Z10 to provide a scaled force error signal at the output terminal of Z11 950. Amplifier Z11 has adjustable gain for introducing premphasis or de-emphasis at the instant of mode transition. The output of the Z11 amplifier is connected to the input of the force error amplifier U35 via input resistor 933 and normally closed contact 4,3 of switch 945.

Analog switch 945, contacts 4,3 represents a scaled force error signal switch for selecting the scaled force error signal at terminal 4 in response to absence of the latch mode transfer signal D(LMT).

FORCE ERROR AMPLIFIER OPERATION

Resistor 942 and capacitor 952 are in the feedback loop when U34-1,16 is open. As the contacts open, a high gain mode is entered having a gain of typically 120 dB at dc. Resistor 942 and capacitor 952 provides a phase lag compensation network back to the input. The rolloff is suitable to the frequency response of the force transducer employed. The capacitor has a value of 0.1 uF. Resistor 942 is 30K. Pot C is a voltage clamp control pot. Pot R determines how much signal is fed back to the input of the amplifier via the RC network of resistor 942 and capacitor 952 to control the gain of the force modes.

The adjustment of Pot R is not related in function to the adjustment of Pot C. Pot C determines at what level the output of U35 will be clamped. In this application the amplifier was set to clamp at 6.6 V to avoid damage to the linear motor and power amplifier.

The diode group 956-960 and the associated resistors represent a clamping circuit to prevent the output signals from U35 from exceeding a predetermined limit. Pot C is a voltage clamp control for the diode group an resistors 954 and 964.

The force error amp, U35 sums two signals at its negative input terminal. The force reference command signal on node 925 and amplified force transducer signal A(AFTS)' developed on FIG. 14.

A(TCEA) is the buffered output of the U35 and subsequent signal limiting that takes place on FIG. 9. A(TCEA) stands for "to current error amplifier" because of an early embodiment. In this embodiment, the signal A(TCEA) is meant to characterize the signal coupled to power amplifier block 12.

Figure 4:
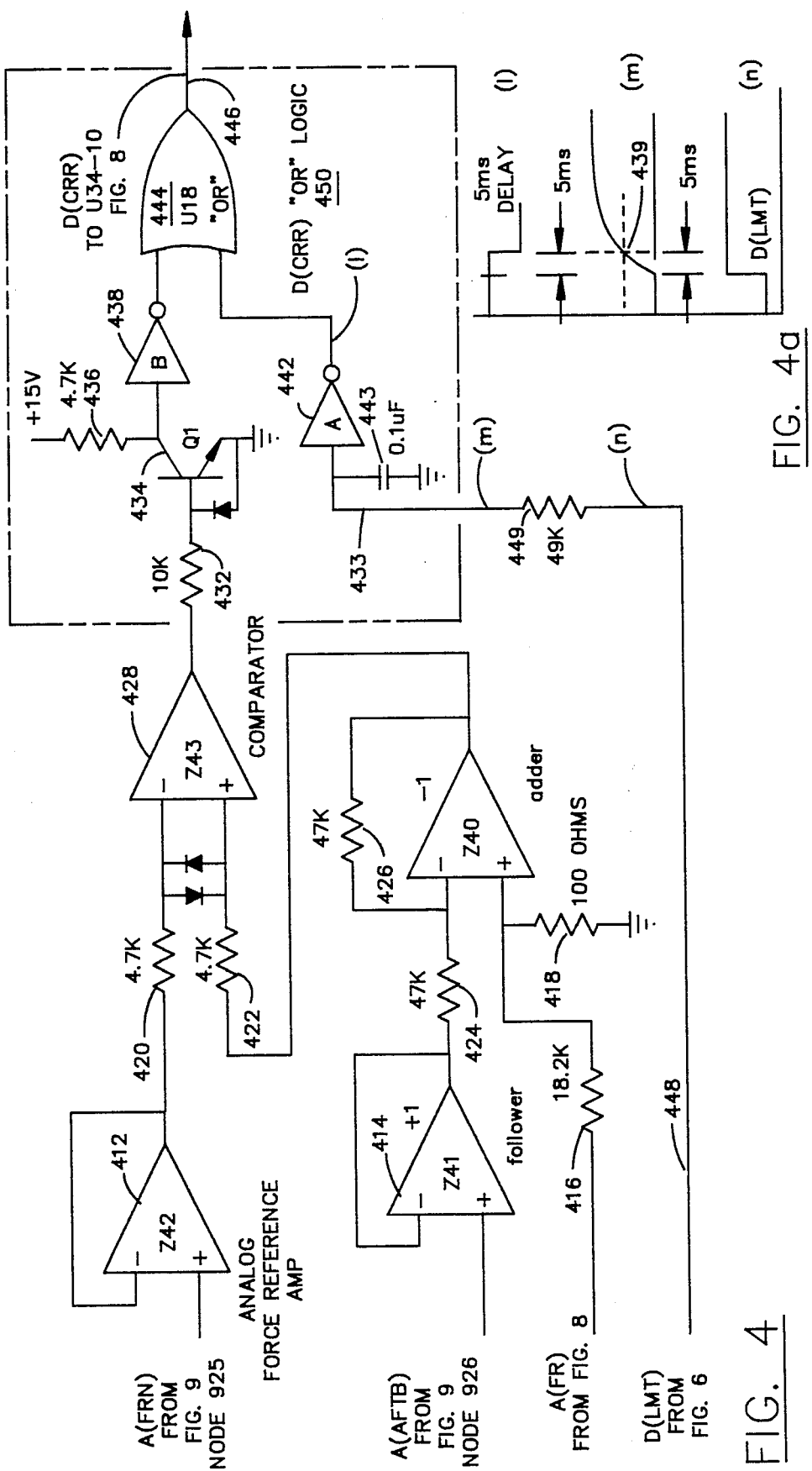
FIG. 4 is the actual force regulator circuit schematic diagram.

Referring to FIG. 9, analog signals A(AFTB) and A(FRN) go to FIG. 4. The A(AFTB) signal originates as A(AFTS)' from FIG. 14 from Instrument Amplifier U46. The A(AFTS)' signal is divded in two be resistors 922 and 928 via virtual ground at the inverting input terminal of amplifier U35 to form the signal A(AFTB) to FIG. 3 and FIG. 4.

Referring to FIG. 4, the A(AFTB) signal is buffered by follower Z41, 414 and inverted by unity gain amplifier Z40. Amplifier Z40 also adds the analog reference level A(FR) from FIG. 8 to A(AFTB). A(FR) is a signal from the DAC U26. The offset A(FR), sets the allowable error between the force reference and the actual force itself. The reference shifted A(AFTB) signal is twice inverted from its source A(AFTS)' and is compared with the buffered force reference command signal A(FRN) by comparator Z43.

The output of comparator Z43 on FIG. 4 is level shifted by Q1, inverted by inverter B and input into OR gate 18. The second input to OR gate U18, is logic signal D(LMT) from FIG. 11. The D(LMT) digital signal from FIG. 11 signals the start of the force versus time sequence.

The output of OR GATE U18 is coupled to control the U34 analog switch control input of FIG. 8. The U34 analog switch has contacts on FIGS. 9 and 8. The function of comparator Z43 is to signal the point at which the analog force signal from the transducer exceeds the predetermined reference signal from the force ramp reference A(FR). On exceeding the reference, the output of OR gate U18 opens the analog switch U34 on FIG. 8 to interrupt A(FRM) signal from DAC means on FIG. 8.

FORCE TRANSDUCER SIGNAOL CONDITIONING

FIG. 14 depicts a signal conditioning circuit for amplifying and conditioning the force signals A(T), A(T)' of the force transducer 23. The force transducer 23 used with the preferred embodiment is a model MC-60 from Transducer Techniques of Rancho California, CA, 92390. The conditioned output signal is A(AFTS)' and it is shown connected to FIG. 9. Signals A(T), A(T)' originate from force transducer bridge 1414 as a result of a variation in the resistance of an element such as resistor 1416. Instrument amplifier U46 1420 is a fixed high gain (Av =700) differential amplifier. A commercial equivalent of this component is a a model AD624B differential amplifier from Analog Devices of Norwood, Mass.

The first and second input terminals of U46 are coupled to receive the force signal from the transducer bridge. A third input terminal 1425 receives an offset compensation signal measured with respect to the reference ground 1431. Resistor 1422 is the gain adjustement.

Referring to FIG. 14, U45 is a driver for the shield. The output of U45 drives the shield up or down in voltage as required to keep the shield at approximately a level common to both input signals, as the input signals rise or fall together in a common mode fashion. Amplifier U45, 1424 drives the shield that covers all low signal level leads positive or negative in voltage as required in response to common mode voltage on the transducer input signal lines to minimize the capacitively induced voltage error on the signal lines carrying A(T) and A(T)'. After amplification, the amplified force transducer signal is outputed to FIG. 9 via analog switches U55B 1418, U55A-3,4 and signal line 1449.

A pre-load is physically applied to the force transducer. A typical pre-load force might be one pound. The total load range to be applied to the force transducer is typically 60 pounds. With a one pound preload on the transducer, the voltage out of the bridge would be 1/60 of the expected total range.

The pre-load is applied to the transducer in the same direction as the transmitted force from the anvil. The U46 instrument amplifier is typically scaled to produce a 0.0 to −5.0 V signal, with 0 V representing zero pounds and −5.0 V representing 60 pounds applied to the transducer.

With no force applied to the transducer, the pre-load force applied to the transducer would control the output voltage of U46 and produce an output voltage at the output of U46 equal to 1/60 of −5.0 volts. Referring to FIG. 14, AND GATE U30D "" logic signals D(R7)

and D(ST) to provide a digital auto-strobe signal to analog switch U55. Analog switch U55B, contact 1418 is transferred in response to D(R7) and D(ST) being true concurrently. The U55A contact 3, 4 disconnects the output of the U46 instrument amplifier from the three-pole active filter in response to the digital auto-stobe signal going true.

The U52 integrator output is programmd to move with a polarity opposite to the polarity of the signal level out of U46 so as to produce a mirror image voltage of equal and opposite polarity. Logic inputs D9R7) and D(ST) produce a 50 millisecond closure of the U55B analog switch for the purpose of resetting the output of the U52 auto-zero sample and hold amplifier at the onset of every machine cycle. The D(ST) pulse controls the duration of the 50 millisecond pulse.

Amplifier U52, 1426 is an auto-zero sample and hold amplifier. During D(ST) interval, U55B closes contact 1418 connecting the output of U46 to the input of U52. The output of U52 moves negatively in response to any positive voltage on its input. As the output of U52 biases the input of U46 negatively, the output of U46 is offset negatively so as to drive a positive signal at the output of U46 from a positive value toward zero.

At the end of the 50 milliseconds interval, U55B opens and the system waits for the moving anvil to reach the workpiece and apply force to it. With U55B open, the output of the U46 amplifier is zero because the response of the force transducer to the pre-load is cancelled by the output of U52. The zero output of U46 is fed via U55A closed contact 3,4 to the unity gain three pole low-pass filter and then to U51 to form an output A(AFTFS) which is used on FIG. 16. The output of the U46 amplifier moves in a negative sense as force is increased. The output from U46 is referred to as an amplifier force transducer signal. The signal out of U48 is an inverted A(AFTFS) signal.

Referring to FIG. 14, the amplified force transducer signal is filtered by an active three-pole filter using amplifier U51, 1450 and having components 1436, 1440, 1438, 1444, 1446 and capacitor 1442. The filtered signal A(AFTFS)' is then inverted by inverting unity gain amplifier U48 1454 using input and feedback resistors 1448 and 1452 respectively to provide the filtered force transducer signal A(AFTFS).

POSITION TRANSDUCER SIGNAL CONDITIONING

The position transducer used in the preferred embodiment was a model E500 transducer form the Schaevutz Co. of Pennasauken, N.J., phone (609)662-8000.

Referring to FIG. 15, the amplifier U60 1532 and its associated circuitry represents a position transducer signal conditioning means for scaling and conditioning the position signal A(P) that is fed to the LVDT IN term of U60 1532 from the position transducer 14 discussed previously in connection with FIG. 1. The conditioned position signal A(PF) is shown as an output of amplifier U59, 1566 and a complement signal A(PF)' is shown as an output of amplifier U61 1570.

The A(PF)' signal is fed to the input of the position servo amplifier on FIG. 10 from the output of U61. The NE5521 is a purchased component from the Signetics Corporation of Sunnyvale, CA. The LVDT is used as a position feedback element. The LVDT unit only provides a feedback position signal in the form of volts per unit distance from a reference position.

Referring to FIG. 15, the A(PF) signal is the mirror image signal of A(PF)'. The A(PF) signal is fed from FIG. 15 to FIG. 16 as an input to the A-TO-D converter U54 to be digitized for transmission to the sequence controller 8 or computer.

Although the invention multi-mode control apparatus has been disclosed and illustraited in detail, it is to be clearly understood that the same is by way of illustraition as an example only and is not to be taken by way of limitation. The spirit and scope of the invention is to be limited only by the terms of the appended claims.

I claim:

1. A multi-mode force control apparatus responsive to a start signal from a sequence controller to initiate a machine sequence to apply a predetermined time dependent force to a workpiece having a variable compliance via a hammer driving a first die, said workpiece being interposed between said first die and a second die, said second die being supported by an anvil referenced to a frame, the force being applied by an actuator referenced to said frame, said actuator having a power amplifier, said actuator power amplifier being responsive to an input control signal, said actuator being characterized to provide a position transducer signal and a velocity transducer signal, said multi-mode force control apparatus comprising:

a force transducer for providing a force signal corresponding to the force applied to the workpiece by said actuator via said first die;

a multi-mode force control circuit being characterized to receive:
said position transducer signal,
said velocity transducer signal,
said force transducer force signal, said multi-mode force control circuit having:

a position mode sequence means for providing a composite position command signal characterizing a predetermined time dependent position of said hammer;

a position servo amplifier responsive to said composite position command signal for providing said input control signal to said power amplifier to move said hammer from a retracted position, to position said first die at high velocity to a predetermined first position close to said workpiece and then to position said first die at a low velocity into contact with said workpiece, said multi-mode force control circuit being further characterized for gradually increasing the amplitude of said input control signal to said power amplifier in accordance with an increasing predetermined force reference command signal representing said predetermined time dependent force, said force signal rising to a value of voltage representing a predetermined ultimate force value, a force hold mode timing means responsive to said force signal exceeding said ultimate force value for providing a force hold mode time interval;

a force rise mode sequence means being responsive to said first die making contact with said workpiece for operation during a force rise mode sequence and said force hold mode time interval for interrupting further increase in said force reference command signal in response to variations in said workpiece compliance to substantially prevent the force applied to said workpiece from exceeding said predetermined time dependent force;

a retract mode sequence means responsive to termination of said force hold mode time interval for returning said hammer to said retracted position.

2. The multi-mode force control apparatus of claim 1 wherein said force rise mode sequence means further comprises:

a digital to analog converter means (DAC means) fo providing a force reference signal A(FR) and a modulating force reference command signal means responsive to a latch mode transfer signal and having:

an interruption means responsive to a force modulating signal, D(CRR), for interrupting said force reference signal A(FR) in accordance with said workpiece variable compliance to provide a modulated analog force reference command signal A(FRM) to an input resistor (918) first terminal, the second terminal of said input resistir being coupled to a force reference command signal capacitor (927), said modulated analog force reference command signal A(FRM) being filtered by said force reference command signal capacitor to form said force reference command signal A(FRN) on said force reference command signal capacitor, an adder for adding a signal voltage scaled to represent a predetermined margin force A(MF) signal to an amplified force transducer signal A(AFTB) to form a force limit signal A(FL), a force comparator for providing said force modulating signal D(CRR) in response to said force limit signal A(FL) exceeding said force reference command signal A(FRN) to interrupt said increase of said force reference command signal A(FRN), and a force error amplifier for providing said input control signal to said power amplifier, said force error amplifier being responsive to interruption of the increase in said force reference command signal to prevent overshoot of force applied to said workpiece, said force modulating signal D(CRR) being interrupted in response to a rise in the force applied to said workpiece resulting in said amplified force transducer signal A(AFTB) exceeding said force limit signal A(FL).

3. The multi-mode force control apparatus of claim 1 wherein said position servo amplifier is further characterized to receive said position transducer signal and said velocity transducer signal for providing a position error signal; and, said multi-mode force control apparatus further comprises:

a force error amplifier being responsive to said force reference command signal and said force transducer force signal for providing a force error signal; and an input control signal matching means for matching the instantaneous amplitude of said force error signal to said position error signal being coupled to said input control signal prior to a latch mode transfer signal changing from a false state to a true state and for matching the instantaneous amplitude of said position error signal to said force error signal being coupled to said input control signal prior to said latch mode transfer signal changing from a true to a false state.

4. The multi-mode force control apparatus of claim 3 wherein said input control signal matching means further comprises:

position scaling means responsive to said force error signal for scaling and matching said force error signal to provide a scaled position error signal;

a composite position error amplifier having an input terminal, and an output terminal, said composite position error amplifier being coupled to provide said scaled position error signal to the input terminal of said position servo amplifier;

a force scaling means responsive to said position error signal for scaling and matching said position error signal to provide a scaled force error signal;

said force error amplifier having an input terminal and an output terminal for providing said force error signal;

an output switching means being responsive to said latch mode transfer signal D(LMT) changing from a false to a true state for disconnectng said composite position command signal from the input terminal of said composite position error amplifier and for coupling said scaled position error signal to the input terminal of said composite position error amplifier and for disconnecting said scaled force error signal from the input terminal of said force error amplifier and for connecting said force reference command signal to the input terminal of said force error amplifier; each of the above signal selections being restored to its initial selection state by said output switching means in response to said latch mode transfer signal changing from a true to a false state.

5. The multi-mode force control apparatus of claim 4 wherein said input control signal matching means further comprises:

a position signal switch having a transfer contact, said position signal switch being characterized to couple said scaled position error signal to said transfer contact in response to said latch mode transfer signal D(LMT) and for coupling said composite position command signal to said transfer contact in the absence of said latch mode transfer signal, said composite position error amplifier having unity gain and an input terminal coupled to said position signal switch transfer contact, said composite position error amplifier output terminal being coupled to the input terminal of said position servo amplifier;

a scaled force error signal switch for selecting said scaled force error signal in response to absence of the latch mode transfer signal D(LMT);

said force error amplifier input terminal being responsive to the signal selected by said scaled force error signal switch, said force error amplifier being further characterized to provide said scaled force error signal at said force error amplifier output terminal in response to absence of said latch mode transfer signal D(LMT).

6. A multi-mode force control apparatus comprising:
a frame;
a workpiece having a first and second surface, said workpiece having variable compliance;
a power amplifier responsive to an input control signal for providing an actuator drive signal;
a hammer;
an anvil for receoving and supporting said second surface of said workpiece with reference to said frame, said workpiece being interposed between said hammer and said anvil;

an actuator responsive to said actuator drive signal and referenced to said frame for moving said hammer from a retracted position into contact with said workpiece interposed between said hammer and said anvil, said actuator being further characterized to be responsive to said actuator drive signal for applying a force to said workpiece via said hammer with reference to said frame;

a force transducer interposed between said anvil and said frame for providing a force signal corresponding to the force applied to said workpiece by said actuator via said hammer;

a preload means for applying a preload force to hold said anvil against said force transducer;

a position transducer for providing a position signal corresponding to the location of said hammer, said position signal having a magnitude corresponding to the distance of said hammer from said retracted position;

a velocity transducer for providing a velocity signal corresponding to the velocity of the hammer with reference to said frame;

a sequence controller providing:
 a digital autozero strobe signal for zeroing said force signal, followed by
 a discrete start signal for initiating each machine cycle, said sequence controller having:
 a memory means for storing a digital ultimate force signal characterizing a maximum force to be applied to said workpiece, and
 a digital slow velocity signal means for monitoring a digital force transducer signal and for providing a force interval start signal as said digital force transducer signal equals or exceeds said digital ultimate force signal,
 a timing means for starting a predetermined force hold time interval in response to said force interval start signal, said timing means being further characterized to reset said discrete start signal following said force hold time interval;

a multi-mode force control circuit being characterized to receive:
 said position transducer position signal,
 said velocity transducer velocity signal,
 said sequence controller digital autozero strobe signal, followed by,
 said discrete start signal, and
 said force signal, said multi-mode force control circuit providing:
 a force threshold reference signal characterizing a minimum level of force to be applied to said workpiece by said hammer required to indicate contact of said hammer with the workpiece and,
 a discrete home position signal in response to said hammer being restored to said retracted position;

said multi-mode force control circuit having a fast position mode sequence means responsive to said discrete start signal to control a fast position mode sequence, said fast position mode sequence being characterized to control said input control signal to move said hammer from said retracted position at high velocity to a first position within a relatively short predetermined distance from said workpiece, said fast position mode sequence means providing a start slow traverse signal in response to said hammer passing said first position, a slow position mode sequence means responsive to said start slow traverse signal for controlling said input control signal to move the hammer at a low velocity into contact with said workpiece in response to a digital slow velocity signal; said multi-mode force control circuit being further characterized to gradually increase the amplitude of said actuator drive signal in accordance with a predetermined voltage versus time relationship, said slow position mode sequence means being further characterized to gradually increase the force applied to said workpiece interposed between said hammer and said anvil, a force threshold detector means responsive to an amplified force transducer signal for providing a latch mode transfer signal in response to said amplified force transducer signal exceeding a predetermined limit; a force rise mode sequence means being responsive to said latch mode transfer signal for initiating a force rise mode sequence characterized to control said input control signal to increase said actuator drive signal to increase the force applied by said actuator via said hammer to said workpiece interposed between said hammer and said anvil in accordance with a predetermined force versus time relationship;

said sequence controller starting a force hold mode in response to said force interval start signal, said multi-mode force control circuit being responsive to said force interval start signal;

said force rise mode sequence means further comprising a regulator means for operation during said force rise mode sequence and a force hold mode sequence for interrupting said predetermined force versus time relationship in accordance with said workpiece variable compliance to substantially prevent the force applied to said workpiece from exceeding said predetermined force versus time relationship;

a retract mode sequence means responsive to said sequence controller for resetting said discrete start signal.

7. The multi-mode force control apparatus of claim 6 wherein said multi-mode force control circuit further comprises a force signal conditioning circuit having:
 a high gain differential amplifier having a predetermined gain, first and second input terminals and an output terminal;
 said force transducer being biased by said preload means to provide said force signal having a magnitude proportional to said preload force;
 said high gain differential amplifier input terminals being coupled to receive said force signal, said high gain differential amplifier, amplifying said force signal to provide an amplified force transducer signal at said output terminal equal to the amplitude of said force signal times the predetermined gain of said high gain differential amplifier, and a third input terminal for receiving a negative offset compensation signal measured with respect to a reference ground to bias said amplified force transducer signal to zero volts with respect to said reference ground,
 an integrator referenced to said reference ground and having an output terminal and an inverting input terminal for receiving said amplified force transducer signal, said intergrator providing an offset compensation signal characterized as a negative real time integral of said amplified force transducer signal at said integrator output terminal, a switch having a normally open conduction channel, a first and second terminal and a control terminal, said switch being responsive to said digital autozero strobe signal to drive said conduction channel into a conductive state, said integrator inverting input terminal being connected to said switch first terminal, said integrator output terminal being coupled to said high gain differential amplifier third input terminal, said high gain differential amplifier output terminal being coupled to said switch conduction channel second terminal, said high gain differential amplifier ouptut terminal providing said amplifier force transducer signal, offset by the value of said offset compensation signal from said integrator output terminal in response to termination of said digital autozero strobe signal.

8. The multi-mode force control apparatus of claim 6 wherein said fast position mode sequence means further comprises:

a fast position mode circuit responsive to said discrete start signal for providing an exponential position command voltage, A(EPC), said exponential position command voltage being characterized to increase exponentially from a zero voltage reference level, said exponential position command voltage being scaled to correspond to a commanded hammer position and clamped at a clamped voltage value corresponding to a predetermined fast travel hammer limit position, said fast position mode circuit being further characterized to compare said exponential position command voltage with a predetermined refernce having a value less than said clamped voltage value to provide said start slow traverse signal for signaling the start of a slow position mode.

9. The multi-mode force control apparatus of claim 8 wherein said slow position mode sequence means further comprises:

a slow position mode circuit responsive to said digital slow velocity signal from said sequence controller and said start slow traverse signal D(SST) from said fast position mode circuit, said slow position mode circuit being characterized to convert said digital slow velocity signal to an analog linear command signal, said slow position mode circuit having means for intergating and scaling said analog linear command signal to provide an analog linear position command signal A(LPC).

10. The multi-mode force control apparatus of claim 6 wherein said fast position mode sequence means further comprises:

a fast position mode circuit responsive to said discrete start signal for providing an exponential position command voltage, A(EPC), said exponential position command voltage being characterized to increase exponentially from a zero voltage reference level, said exponential position command voltage being scaled to corresponding to a commanded hammer position and clamped at a clamped voltage value corresponding to a predetermined fast travel hammer limit position, said fast position mode circuit being further characterized to compare said exponential position command voltage with a predetermined start slow traverse reference voltage signal having a value less than said clamped voltage value and slow traverse comparator means for providing said start slow traverse signal (D(SST)) for signaling the start of a slow position mode sequence; and, said slow position mode sequence means further comprises:

a slow position mode sequence circuit responsive to said digital slow velocity signal from said sequence controller and said start slow traverse signal D(SST) from said fast position mode circuit, said slow position mode circuit being characterized to convert said digital slow velocity signal to a slow position command signal, said slow position mode sequence circuit having means for integrating and scaling said slow position command signal to provide an analog linear position command signal A(LPC);

a position memory means responsive to the discrete start signal for continuously storing a composite position command signal on a capacitor and for discharging said composite position command signal at a predetermined rate in response to termination of said discrete start signal, means for summing said exponential position command voltage A(EPC) and said linear position command signal A(LPC) to form said composite position command signal, said force threshold detector means responsive to said amplified force transducer signal and to a predetermined force threshold reference voltage level A(LMTR) corresponding to a predetermined force threshold level for providing said latch mode transfer signal D(LMT) having a true state in response to said amplified force transducer signal A(AFTS) exceeding said predetermined force threshold reference voltage level A(ALMTR) and a false state in response to said predetermined force threshold reference voltage level A(ALMTR) exceeding said amplified force transducer signal A(AFTS), position transducer signal conditioning means for scaling and conditioning said position transducer position signal to provide a conditioned position signal A(PF), servo amplifier means for summing said velocity transducer velocity signal, said position transducer position signal and said composite position command signal to provide a position error signal A(-VEA);

force reference command signal means (U26) responsive to said digital ultimate force signal for converting said digital ultimate force signal to an force reference signal A(FR) and for applying said force reference signal A(FR) via an input resistor to a force reference command signal capacitor (927) to form a force reference command signal A(FRN) having a predetermined time dependent voltage corresponding to a predetermined time dependent force;

a force mode amplifier circuit (U35) responsive to an inverted scaled amplified force transducer signal A(AFTS)' and to said force reference command signal A(FRN) for providing a force error signal corresponding to said predetermined force;

a modulating force reference command signal means 30 for interrupting said force reference signal A(FR) in response to random reduction of applied force to said workpiece in excess of a predetermined margin force A(MF) resulting from random reduction in workpiece compliance, the interruption of said force reference signal A(FR) interrupting the predetermined rise of said force reference command signal, said force mode amplifier circuit U35 being responsive to interruption of said predetermined rise of said force reference command signal to prevent overshoot of said force error signal thereby preventing overshhot of force applied to said workpiece;

output switching means (37) being responsive to said latch mode transfer signal D(LMT) and said digital ultimate force signal for selecting said force error signal for said input control signal and for selecting said position error signal for said input control signal in the absence of said latch mode transfer signal for said input control signal.

11. The multi-mode force control apparatus of claim 10 wherein said modulating force reference command signal means further comprises:

an interruption means responsive to a force modulating signal D(CRR) for interrupting said force reference signal A(FR) in accordance with said workpiece variable compliance to provide a modulated force reference command signal A(FRM) to said input resistor 918 first terminal, the second terminal of said input resistor being coupled to said force reference command signal capacitor, said modulated force reference command signal A(FRM) being filtered by said force reference commane signal capacitor to form said force reference command signal A(FRN) on said force reference command signal capacitor, an adder for adding a predetermined margin force signal to the amplified force transducer signal A(AFTB) to form a force limit signal A(FL), a force comparator for providing said force modulating signal D(CRR) in response to said force limit signal A(FL) exceeding said force reference command signal A(FRN) to interrupt said predetermined time dependent voltage A(FRN), said force mode amplifier circuit being responsive to interruption of said predetermined time dependent voltage to prevent overshoot of force applied to said workpiece, said force modulating signal D(CRR) being interrupted in response to said force reference command signal A(FRN) exceeding said force limit signal A(FL).

12. The multi-mode force control apparatus of claim 11 wherein said multi-mode force control circuit further comprises:

an input control signal matching means for matching the instantaneous amplitude of said force error signal to said position error signal being coupled to said input control signal prior to said latch mode transfer signal changing from a false state to a true state and for matching the instantaneous amplitude of said position error signal to said force error signal being coupled to said input control signal prior to said latch mode transfer signal changing from a true to a false state.

13. The multi-mode force control apparatus of claim 12 wherein said input control signal matching means further comprises:

position scaling means responsive to said force error signal for scaling and matching said force error signal to provide a scaled position error signal;

composite position error amplifier having an input terminal, and an output terminal, said composite position error amplifier being coupled to provide said scaled position error signal to the input terminal of said servo amplifier means;

force scaling means responsive to said position error signal for scaling and matching said position error signal to provide a scaled force error signal;

a force error amplifier having an input terminal and an output terminal for providing said force error signal;

said output switching means also being responsive to said latch mode transfer signal D(LMT) changing from a false to a true state for disconnecting said composite position command signal from the input terminal of said composite position error amplifier and for coupling said scaled position error signal to the input terminal of said composite position error amplifier and for disconnecting said scaled force error signal from the input terminal of said force error amplifier and for connecting said input resistor second terminal to said force reference command signal capacitor (927), said force reference command signal capacitor being coupled to the input terminal of said force error amplifier; each of the above signal selections being restored to its initial selection state by said output switching means in response to said latch mode transfer signal changing from a true to a false state.

14. The multi-mode force control apparatus of claim 12 wherein said input control signal matching means further comprises:

position scaling means responsive to said force error signal for scaling and matching said force error signal to provide a scaled position error signal;

a position signal switch for selecting said scaled position error signal in response to said latch mode transfer signal D(LMT) and for selecting said composite position command signal in the absence of said latch mode transfer signal;

composite position error amplifier having unity gain and an input terminal coupled to receive the signal selected by said position signal switch, and an output terminal, said composite position error amplifier output being coupled to provide buffered signal selected by said position signal switch to the input terminal of said servo amplifier means;

force scaling means responsive to said position error signal for scaling and matching said position error signal to provide a scaled force error signal;

a scaled force error signal switch for selecting said scaled force error signal in response to absence of the latch mode transfer signal D(LMT);

a force error amplifier U35 having an input terminal responsive to the signal selected by said scaled force error signal switch and an output terminal, said amplifier being further characterized to provide said scaled force error signal at its output terminal in response to absence of said latch mode transfer signal D(LMT).

15. A multi-mode force control apparatus responsive to a start signal from a sequence controller to initiate a machine sequence to apply a predetermined time dependent force to a workpiece having a variable compliance via a hammer driving a first die, said workpiece being interposed between said first die and a second die, said second die being supported by an anvil referenced to a frame, the force being applied by an actuator referenced to said frame, said actuator having a power amplifier, said actuator power amplifier being responsive to an input control signal, said actuator being characterized to provide a position transducer signal and a velocity transducer signal, said multi-mode force control apparatus comprising:
- a force transducer for providing a force signal corresponding to the force applied to said workpiece by said actuator via said first die;
- a multi-mode force control circuit being characterized to receive:
  - said position transducer signal,
  - said velocity transducer signal,
  - said force transducer force signal,
- said multi-mode force control circuit having:
- a position mode sequence means for providing a composite position command signal characterizing a predetermined time dependent position of said hammer;
- a position servo amplifier responsive to said composite position command signal for providing said input control signal to said power amplifier to move said hammer from a retracted position, to position said first die at high velocity to a predetermined first position close to said workpiece and then to position said first die at a low velocity into contact with said workpiece,
- a force threshold detector means responsive to said force transducer force signal for providing a latch mode transfer signal in response to said force transducer force signal exceeding a predetermined limit;
- an offset correction circuit for initializing a force reference command signal to equal said force transducer force signal predetermined limit prior to said latch mode transfer signal going true;
- said multi-mode force control circuit being further characterized for gradually increasing the amplitude of said input control signal to said power amplifier in accordance with an increasing predetermined force reference command signal representing said predetermined time dependent force, said force signal rising to a value of voltage representing a predetermined ultimate force value, a force hold mode timing means responsive to said force signal exceeding said ultimate force value for providing a force hold mode time interval;
- a force rise mode sequence means being responsive to said first die making contact with said workpiece for operation during a force rise mode sequence and said force hold mode time interval for interrupting further increase in said force reference command signal in response to variations in said workpiece compliance to substantially prevent the force applied to said workpiece from exceeding said predetermined time dependent force;
- a retract mode sequence means responsive to termination of said force hold mode time interval for returning said hammer to said retracted position.

* * * * *